(12) United States Patent
Hosaka

(10) Patent No.: US 8,438,348 B2
(45) Date of Patent: May 7, 2013

(54) DISK ARRAY DEVICE

(75) Inventor: Fumiaki Hosaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 827 days.

(21) Appl. No.: 12/155,450

(22) Filed: Jun. 4, 2008

(65) Prior Publication Data

US 2009/0249008 A1    Oct. 1, 2009

(30) Foreign Application Priority Data

Mar. 27, 2008  (JP) ................................. 2008-082957

(51) Int. Cl.
*G06F 1/30* (2006.01)
*G06F 3/06* (2006.01)
*G06F 11/16* (2006.01)
*G06F 12/00* (2006.01)
*G06G 7/18* (2006.01)
*H02J 9/06* (2006.01)
*H02J 7/00* (2006.01)

(52) U.S. Cl.
USPC .... 711/162; 711/113; 711/114; 711/E12.019; 711/E12.103; 714/6.3; 714/14; 714/22; 714/E11.083; 714/E11.12; 713/340; 327/336; 320/149

(58) Field of Classification Search ........................ None
See application file for complete search history.

(56) References Cited

U.S. PATENT DOCUMENTS

| | | | | |
|---|---|---|---|---|
| 4,611,289 | A | * | 9/1986 | Coppola .......................... 714/22 |
| 5,455,499 | A | * | 10/1995 | Uskali et al. ................ 340/636.1 |
| 5,606,242 | A | * | 2/1997 | Hull et al. ...................... 320/106 |
| 5,721,688 | A | * | 2/1998 | Bramwell ........................ 702/63 |
| 6,377,798 | B1 | * | 4/2002 | Shaffer et al. .............. 455/426.1 |
| 6,466,024 | B1 | * | 10/2002 | Rogers ........................... 324/427 |
| 6,502,044 | B1 | * | 12/2002 | Lane et al. ....................... 702/63 |
| 7,006,906 | B2 | * | 2/2006 | Kobayashi et al. ............. 701/22 |

(Continued)

FOREIGN PATENT DOCUMENTS

| | | |
|---|---|---|
| JP | 63-175911 A | 7/1988 |
| JP | 8161236 | 11/1994 |

(Continued)

OTHER PUBLICATIONS

Office Action, issued from the Japanese Patent Office, in corresponding Japanese Patent Application No. 2008-082957, dated May 22, 2012, pp. 1-5.

*Primary Examiner* — Reginald Bragdon
*Assistant Examiner* — Daniel Bernard
(74) *Attorney, Agent, or Firm* — Stites & Harbison PLLC; Juan Carlos A. Marquez, Esq.; Nicholas B. Trenkle, Esq.

(57) ABSTRACT

In control of the disk array device (backup system), when a blackout occurs, the disk array device is first operated in a first method to backed up a main memory by using a power supply from a battery. During the first method, a blackout continuous time and the like are integrated, and at a timing in which the integrated value satisfies a condition, the first method is then shifted to the second method to evacuate data from the main memory onto a nonvolatile memory based on a power supply.

13 Claims, 19 Drawing Sheets

U.S. PATENT DOCUMENTS

| | | | |
|---|---|---|---|
| 7,254,742 B2 * | 8/2007 | Hayashi | 714/14 |
| 7,383,137 B2 * | 6/2008 | Hanebutte | 702/57 |
| 7,836,025 B1 * | 11/2010 | Bali et al. | 707/687 |
| 2002/0195997 A1 * | 12/2002 | Peek et al. | 320/134 |
| 2004/0128086 A1 * | 7/2004 | Barsoukov et al. | 702/63 |
| 2005/0270927 A1 * | 12/2005 | Hayashi | 369/47.1 |
| 2007/0033433 A1 * | 2/2007 | Pecone et al. | 714/6 |
| 2007/0094446 A1 | 4/2007 | Sone et al. | |
| 2008/0071483 A1 * | 3/2008 | Eaves | 702/63 |
| 2009/0248331 A1 * | 10/2009 | Barsukov | 702/63 |
| 2010/0045240 A1 * | 2/2010 | Bergveld et al. | 320/132 |

FOREIGN PATENT DOCUMENTS

| | | |
|---|---|---|
| JP | 9-330277 A | 12/1997 |
| JP | 2000-227880 A | 8/2000 |
| JP | 2002-099390 A | 4/2002 |
| JP | 2007-115050 A | 5/2007 |

* cited by examiner

DISK ARRAY DEVICE

CROSS-REFERENCE TO RELATED APPLICATION

The present application claims priority from Japanese Patent Application No. JP 2008-082957 filed on Mar. 27, 2008, the content of which is hereby incorporated by reference into this application.

TECHNICAL FIELD OF THE INVENTION

The present invention relates to a disk array device (storage device) and a backup method; in particular, to a backup method of data on a memory by using a battery at a time of an occurrence of blackout/power return.

BACKGROUND OF THE INVENTION

As a backup method of data in a volatile memory (main memory) in a controller of a conventional disk array device (hereinafter, simply referred to as a device (system)), there are a first method (FIG. 1A) and a second method (FIG. 1B) as described below.

(1) In the first method ("memory backup method"), when a blackout occurs, by using a battery, a power is supplied to a memory from the battery to retain data in the memory by a refresh operation or the like. In the first method, a time period (backup time) in which the data is retained with an operation of supplying the power to the memory (memory backup operation) is determined depending on a capacity (remaining amount) of the battery. A backup power (battery consumption amount) increases depending on the backup time, configuration of the device (memory capacity, etc.) and the like.

(2) In the second method ("nonvolatile memory evacuation method"), when a blackout occurs, data on the memory (main memory) is evacuated to a nonvolatile memory (backup memory).

A general blackout, particularly a short-time blackout will be supplementarily explained as follows. The short-time blackout includes "instantaneous voltage drop", "momentarily blackout" and "instantaneous blackout". "Instantaneous voltage drop" means that the voltage of a line power source drops instantaneously (for several milliseconds to several seconds). "Momentarily blackout" means that the line power source instantaneously turns off (for several milliseconds to several seconds). "Instantaneous blackout" means that the line power source instantaneously turns off (for several milliseconds to several seconds), which is generally longer than the momentarily blackout.

In addition, the short-time blackout generally occurs more frequently than the long-time blackout. FIG. 19 shows occurrences of the instantaneous voltage drop in Japan (cited from EMCC report No. 46-3). The horizontal axis represents a voltage drop ratio ("%"); the axis in a depth direction represents a continuous time ("cycle"); and the vertical axis represents a frequency ("times/year"). For example, an instantaneous voltage drop with 20% of the voltage drop ration and about 3-cycle of the continuous time most frequently occurs. As described above, the occurrence frequency such as the instantaneous voltage drop is relatively high. The blackout characteristics such as a total time of occurrences of blackout per year are different depending on a country or region.

Japanese Patent Application Laid-Open Publication No. 8-161236 (Patent document 1) discloses an example of the second method. That is when a voltage of a backup power source drops, data stored in a volatile memory is evacuated to a nonvolatile memory.

SUMMARY OF THE INVENTION

The first method (mode) has the following problems. Recently, on the basis of technical innovation in storage capacity of single device and improvement of device performance, capacity of memory (main memory) in a disk array device has been increased. With this, backup power is increased, and a battery capacity mounted on a device also tends to be increased. However, the battery capacity mounted on a device has a limitation in aspects of physical size and costs. While demands for saving power consumption and spaces of a device and a battery are increasing, it is important to reduce the battery capacity (suppression of increase of the battery capacity).

However, in the first method, when the long-time blackout occurs, a long time is required for a backup time. Therefore, an amount of battery consumption (backup power) becomes large. Accordingly, the battery capacity to be mounted on a device becomes large, and thereby not meeting the demand for reducing the battery capacity. Also, when the battery capacity mounted on a device is reduced, an insufficient amount of the battery may cause a power failure on the main memory, and result in destruction of data. Therefore, there is a disadvantage in an aspect of data integrity.

The second method (mode) has the following problems. In the second method, compared to the first method, the battery consumption amount (backup power) for a backup operation (to evacuate data onto a nonvolatile memory) is smaller. Also, since a nonvolatile memory is used, an effect of securing the data integrity for a long-time blackout is high. However, in the second method, when the power returns to the device, it is necessary for the system to restore the data (evacuated data) on the nonvolatile memory onto the main memory. At this time, an overhead occurs due to reading and converting the data. As a result, temporarily lowered performance of the device (a system suspended state) occurs. In the case of the short-time blackout, the reading/restoring operation time (system restarting) is a large load and causes the lowered performance of the device state time (period of lowered system performance) longer. Further, since the short-time blackout such as the instantaneous blackout occurs frequently, in the case where the short-time blackout occurs successively, the system becomes further unstable. Therefore, it is important to reduce the restart time (period of lowered system performance) after the short-time blackout.

Characteristics of the conventional arts (first method and second method) will be schematically summarized as follows. a: the battery capacity for the long-time blackout; b: restart time (period of lowered system performance) when a blackout occurs and the power returns; and c: data integrity during blackout time.

As for "a", in the first method, the battery capacity is large (disadvantageous), meanwhile in the second method, the battery capacity is small (advantageous). In the first method, as described above, a longer blackout time requires a larger battery capacity. In the second method, even in a case of the long-time blackout, since a constant power is enough to supply the power to the memory and the like, the battery capacity can be small.

As for "b", the restart time is short (advantageous) in the first method, meanwhile a considerably long time is required (disadvantageous) in the second method. In the first method, since operation such as data read-out/restoring is unnecessary and there is no restart time, the restart time is short as a whole. In the second method, since a time for operation such as data read-out/restoring (system restarting time) is required, the period of lowered system performance becomes longer.

As for "c", in the first method, the data integrity during blackout time is proportional to the battery capacity (disadvantageous), meanwhile in the second method, the data integrity during blackout time is ensured for a sufficiently long time (advantageous). In the first method, the data integrity becomes higher according to making the battery capacity larger. In the second method, once the data is evacuated to a nonvolatile memory, the data integrity is maintained for a sufficiently long time period.

The present invention has been made in view of the above problems. A main object of the present invention is related to a disk array device (backup system), and is to provide a technology capable of achieving reduction of the battery capacity, ensuring the data integrity, and reduction of the restart time (period of the lowered performance system). Particularly, the present invention is to provide a technology capable of reducing the battery capacity and ensuring the data integrity in the case of the long-time blackout, and reducing the restart time in the case of the short-time blackout.

The typical ones of the inventions disclosed in this application will be briefly described as follows. In order to achieve the above mentioned objects, a typical embodiment of the present invention relates to a disk array device and a backup method, and comprises a first volatile memory (main memory) in which a first data is stored in a controller. And in a configuration that comprises a second nonvolatile memory connected to the first memory and a battery used for data backup, the typical embodiment has the following configuration as a method for backing up data of the first memory.

The present embodiment employs a backup method in which both of the first and second methods are used and controlled in a combination manner. When the blackout occurs and the power supply returns, switching (shifting) of the first and second methods (modes) is controlled in accordance with conditions such as a time period and a battery level.

In a control of the present method, when a blackout occurs, first of all, the operation is performed in the first method (mode) (backup by supplying the power to the first memory). With this, a blackout continuous time or a battery discharge current amount is integrated, and in accordance with condition determination of the integrated value, the operation is shifted to the second method (mode) (data evacuating operation to the second memory based on the power supply from the battery).

In the present control, taking advantages/disadvantages of the respective methods into consideration, it is arranged that the mode shift can be controlled and set, and whereby effects of both methods can be well balanced. Specifically, the first mode that is superior in restarting when the power returns is applied to the initial stage of the blackout (corresponding to the short-time blackout), and the second mode that is superior in reducing the battery capacity and ensuring the data integrity is applied to the later stage (corresponding to the long-time blackout). With this arrangement, a total effect becomes high. That is, when the short-time blackout, the restart time can be reduced by applying the first mode. When the long-time blackout occurs, the battery capacity can be reduced and the data integrity is ensured by applying the second mode.

The present control is totally performed by, for example, a control microcomputer which is provided with a controller and connected to a memory provided and the buttery.

In a first control example, as a determination condition of the shift, when the integrated value of the blackout continuous time reaches a predetermined time (threshold value), the mode is shifted.

In a second control example, when the integrated value of the battery discharge current amount (battery consumption amount or battery remaining amount) reaches a predetermined amount, the mode is shifted. A battery state can be recognized with the integrated value. A battery amount, in which the battery capacity is subtracted by a battery amount required for the operation (evacuating operation) of the second mode, is corresponding to a time period capable of performing the operation of the first mode.

In a third control example, both of the time and the current amount are integrated and controlled. Within a range of the battery amount corresponding to the time period capable of performing the operation of the first mode, a time period as a threshold value is determined.

In the present embodiment, selection of the above-mentioned control examples and the threshold value of the time period can be automatically set by the system, or can be set by a user with a setting processing function.

For example, a disk array device according to the present embodiment includes a controller having a first memory and a second memory. When the blackout occurs and the power returns, to control a backup of a first data, a first mode in which the first data is retained based on the power supply from the battery to the first memory, and a second mode in which the first data is evacuated from the first memory onto the second memory based on the power supply to the respective units from the battery and which waits for the power return are used. When the blackout occurs, first, the system is operated in the first mode for a predetermined time and the power from the battery corresponding to the time, and then the mode is shifted to the second mode to operate.

The effects obtained by typical aspects of the present invention disclosed in the present application will be briefly described below. According to the typical embodiments of the present invention, reducing the battery capacity, ensuring the data integrity, and reducing the restart time (period of the lowered system performance) can be achieved. Particularly, when the long-time blackout occurs, the battery capacity can be reduced and the data integrity can be ensured. In addition, when the short-time blackout occurs, the restart time can be reduced. Further, the battery capacity mounted on the device can be reduced and optimized; a life of the nonvolatile memory can be increased; and the system liability can be improved.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

BRIEF DESCRIPTIONS OF THE DRAWINGS

Figure 8A:
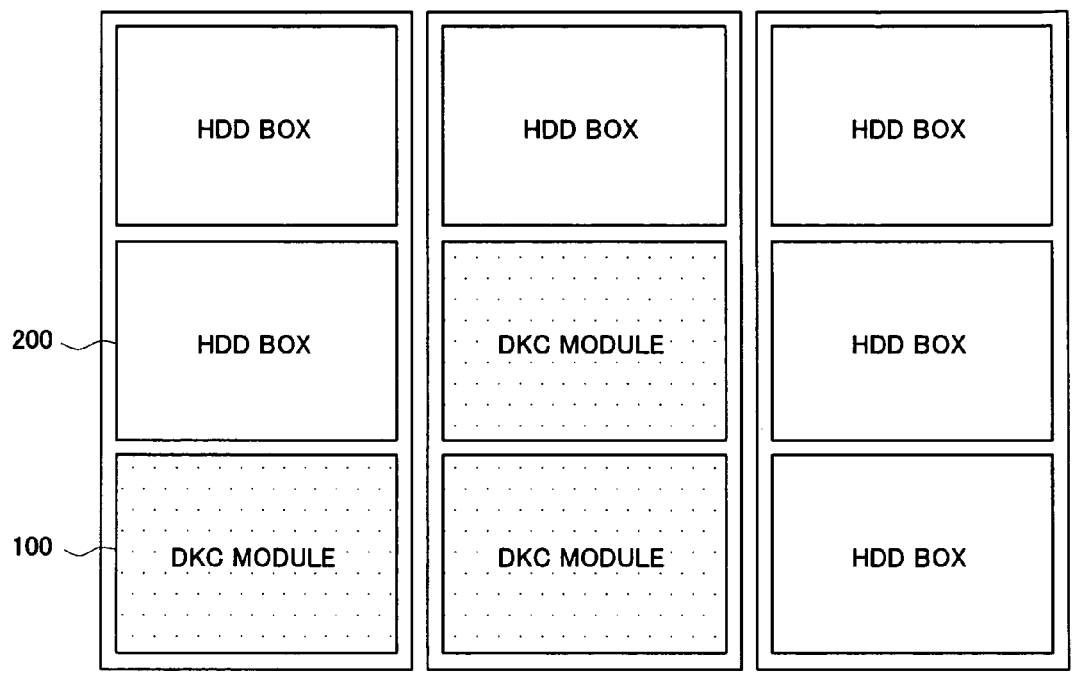
Figure 8B:
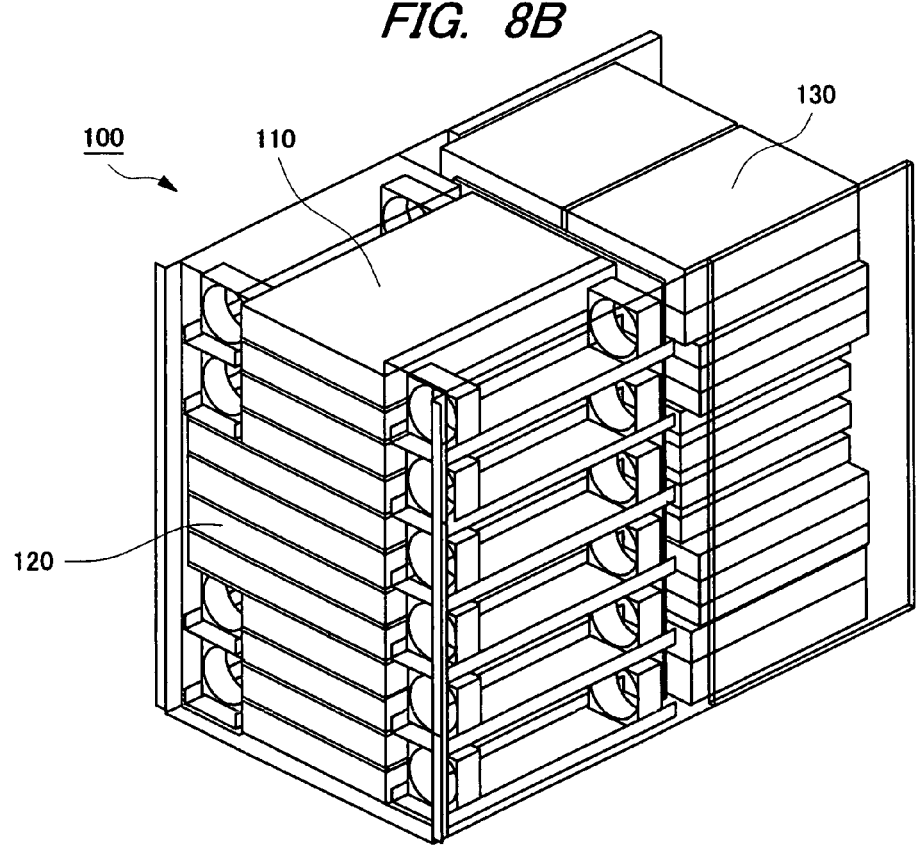
Figure 9:
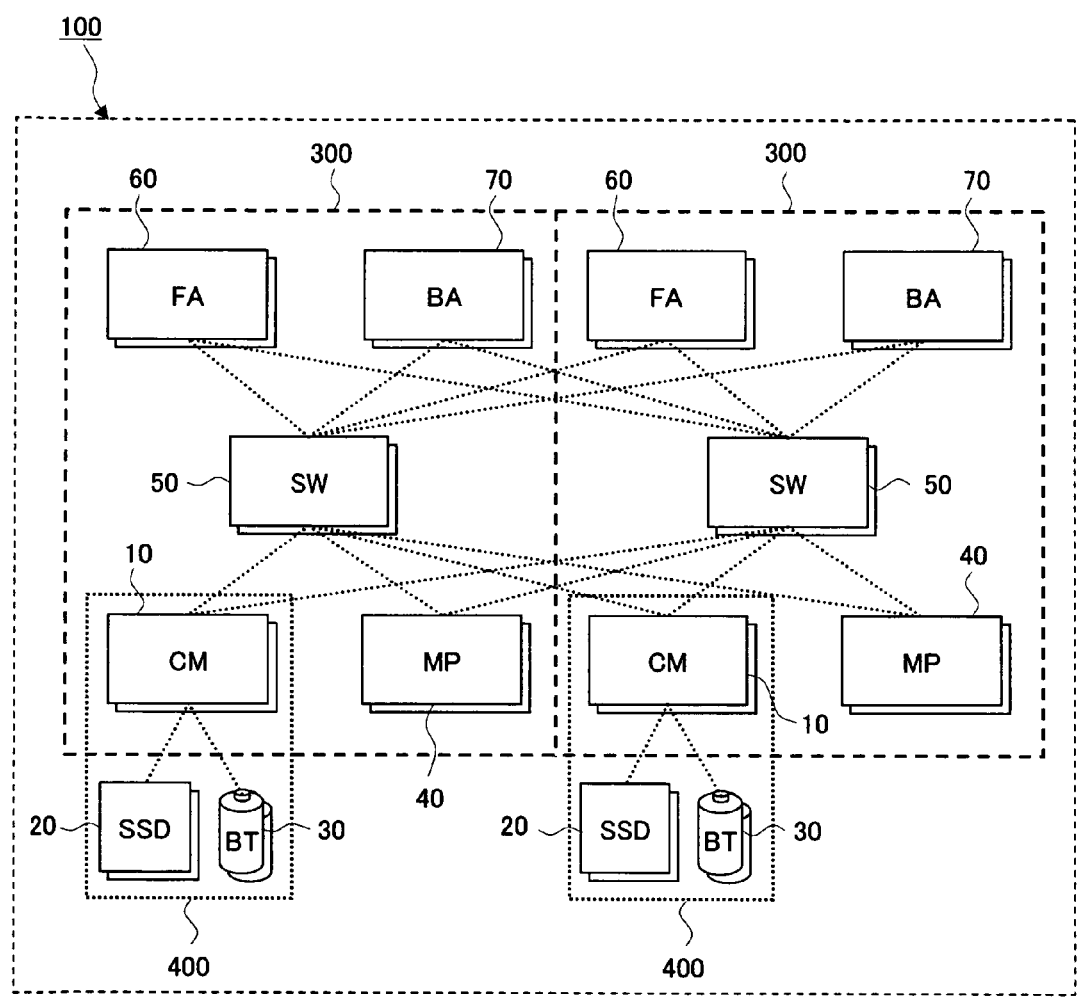
Figure 10:
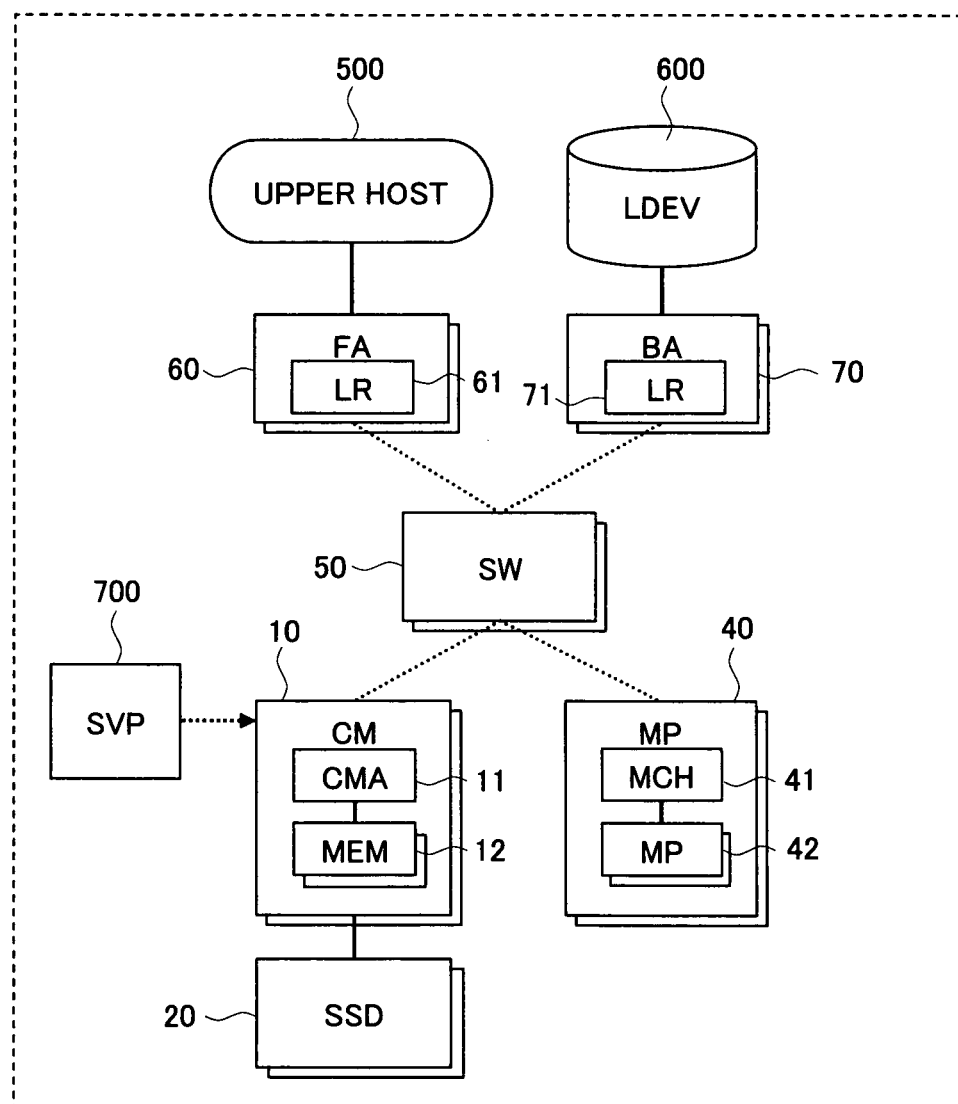
Figure 11:
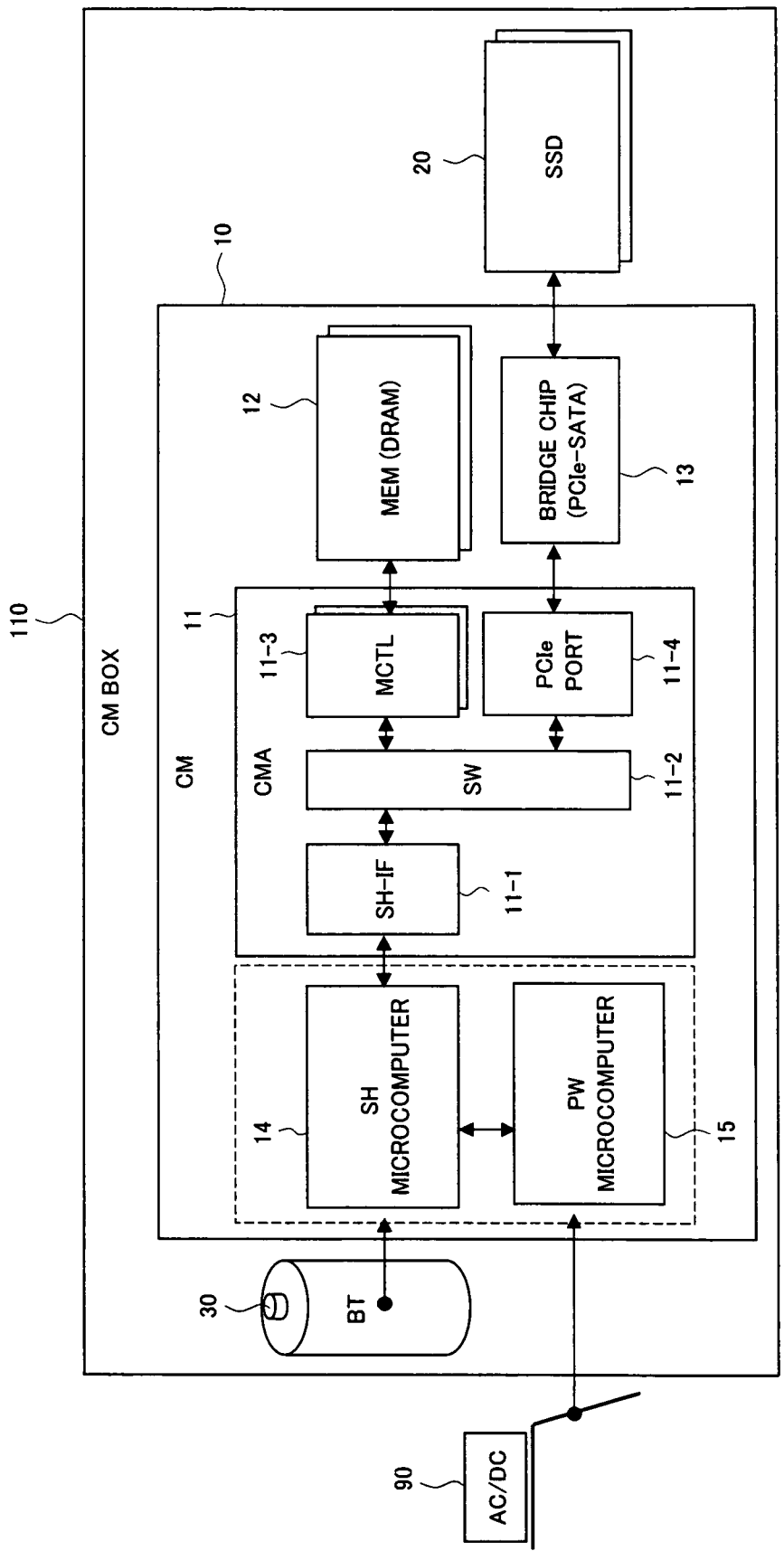
Figure 12:
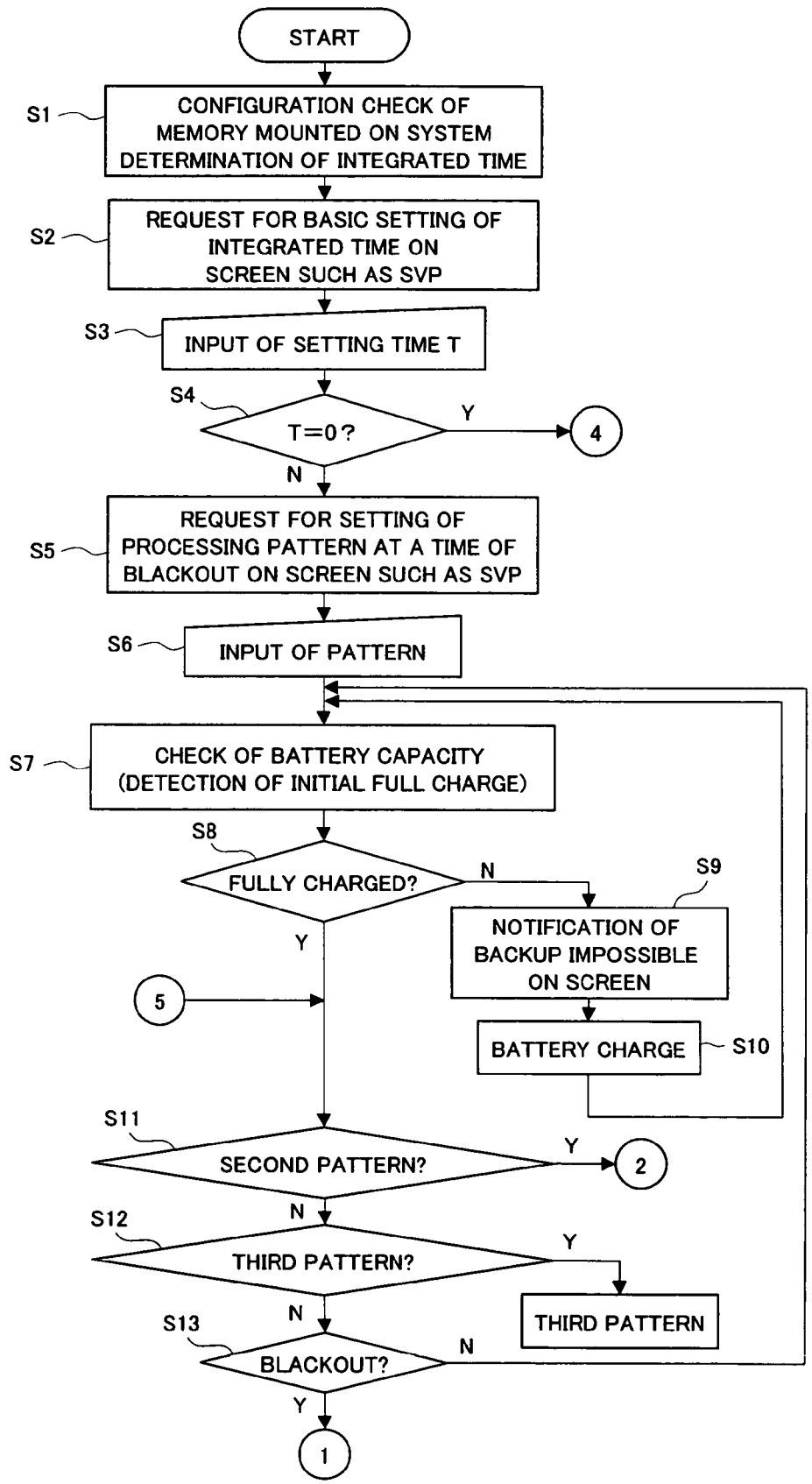
Figure 13:
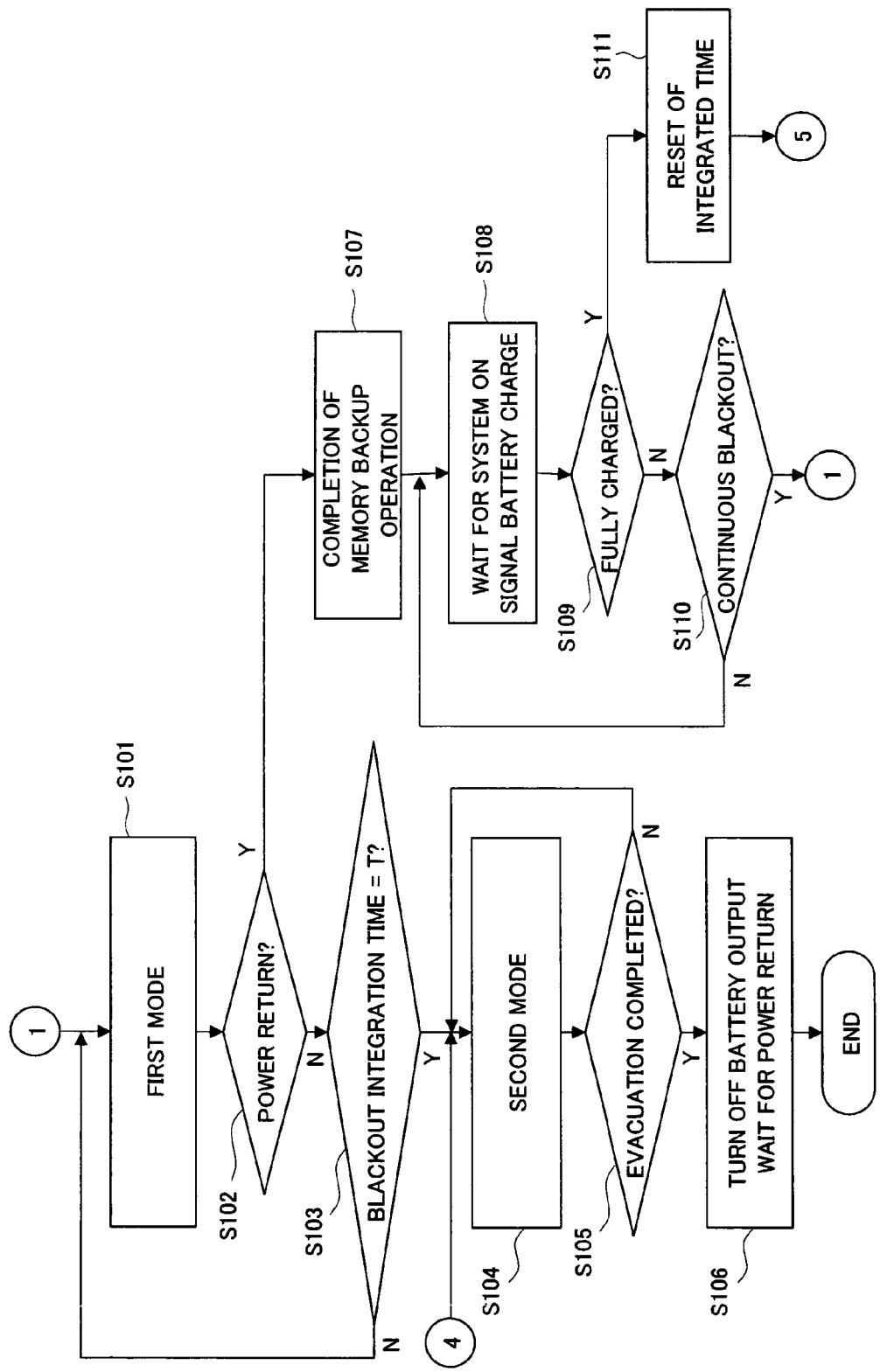
Figure 15:
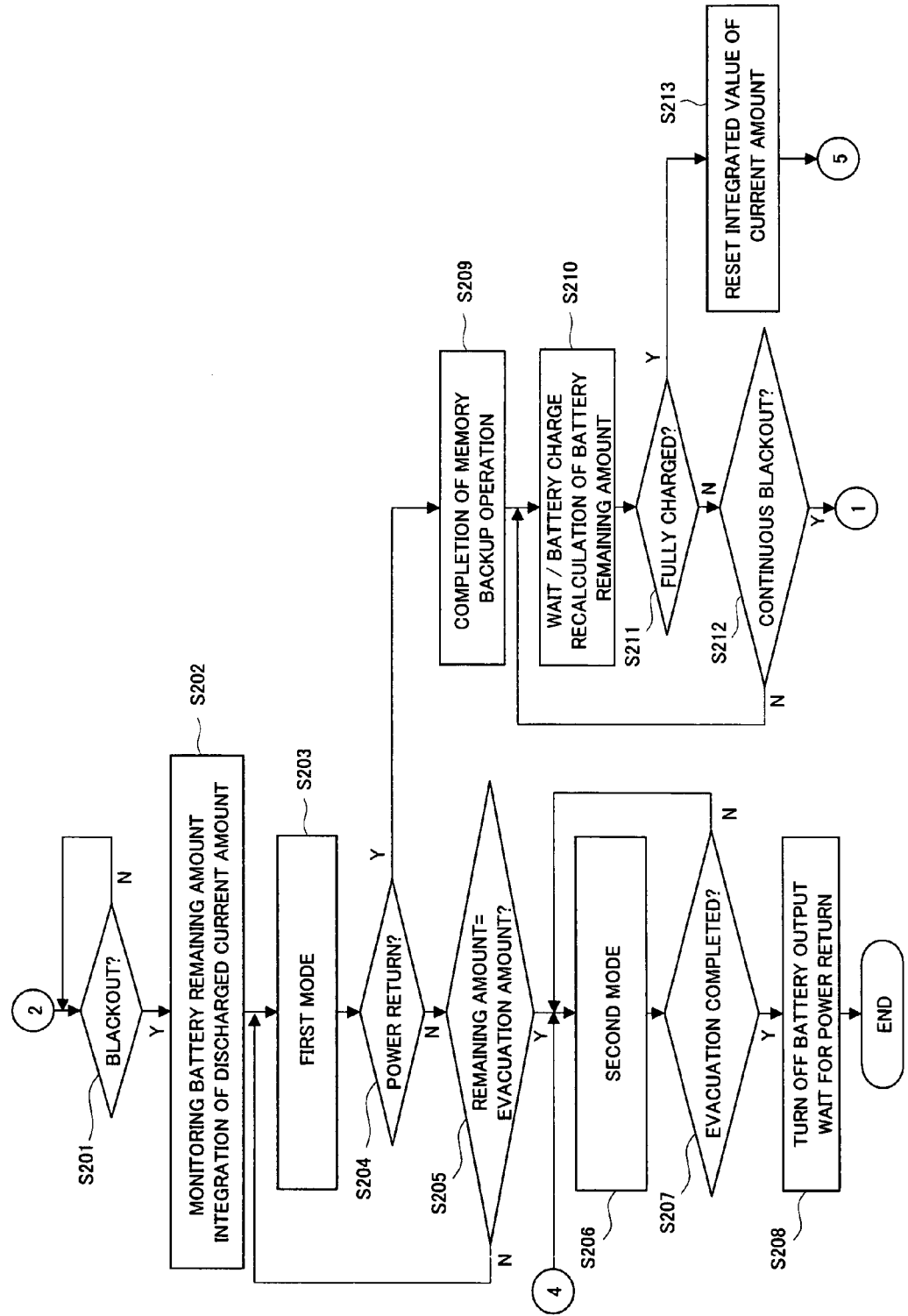
Figure 16A:
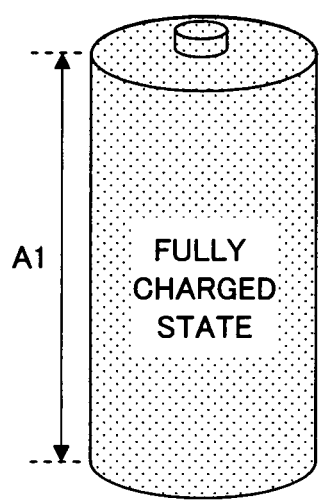
Figure 16B:
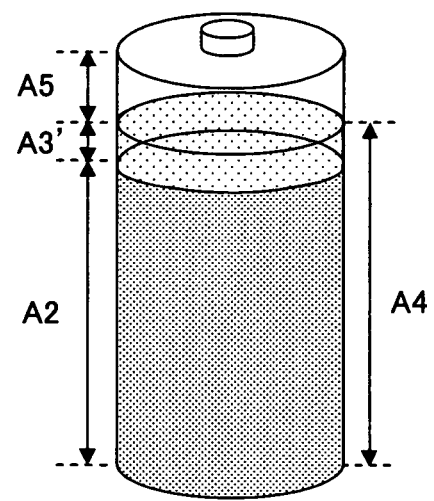
Figure 17A:
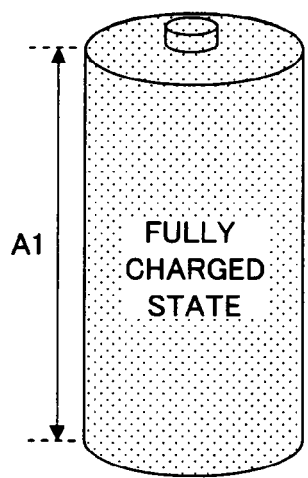
Figure 17B:
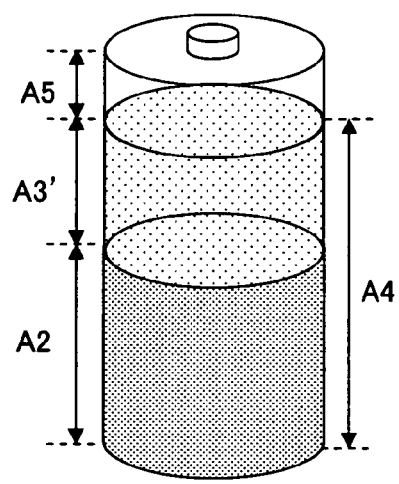
Figure 17C:
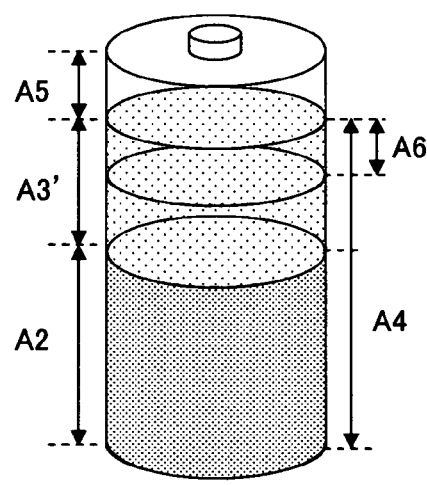
Figure 18:
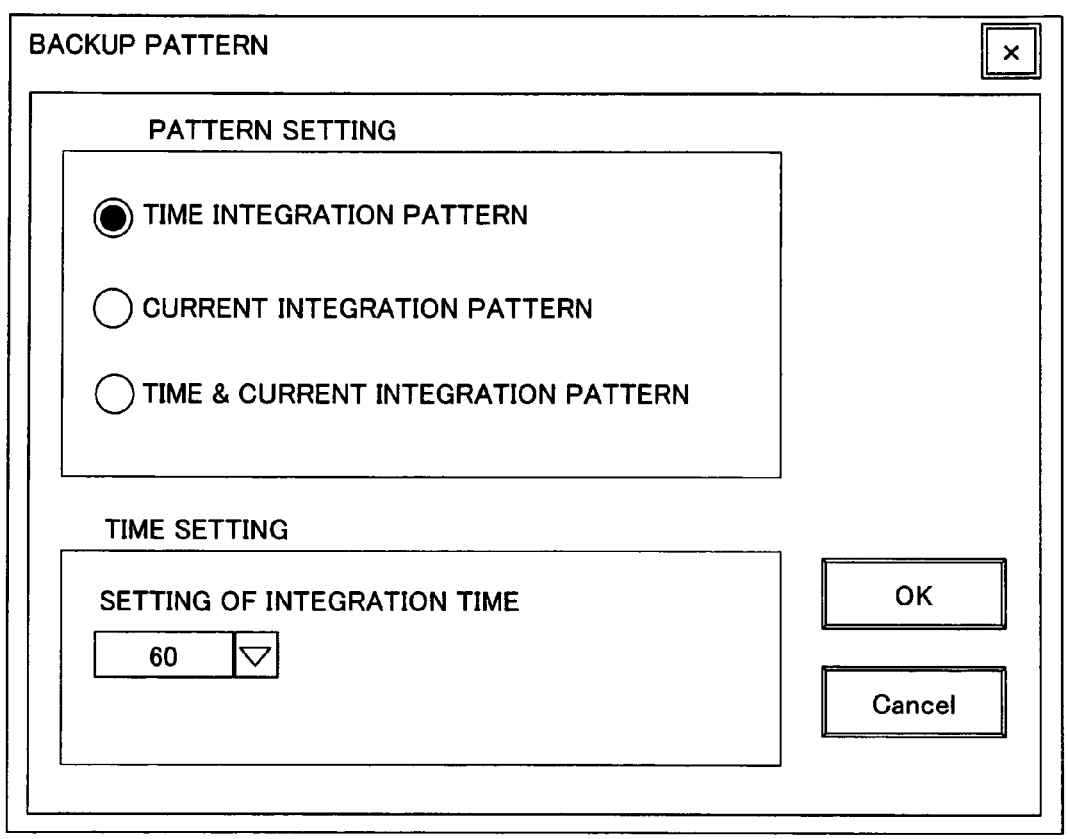
Figure 19:
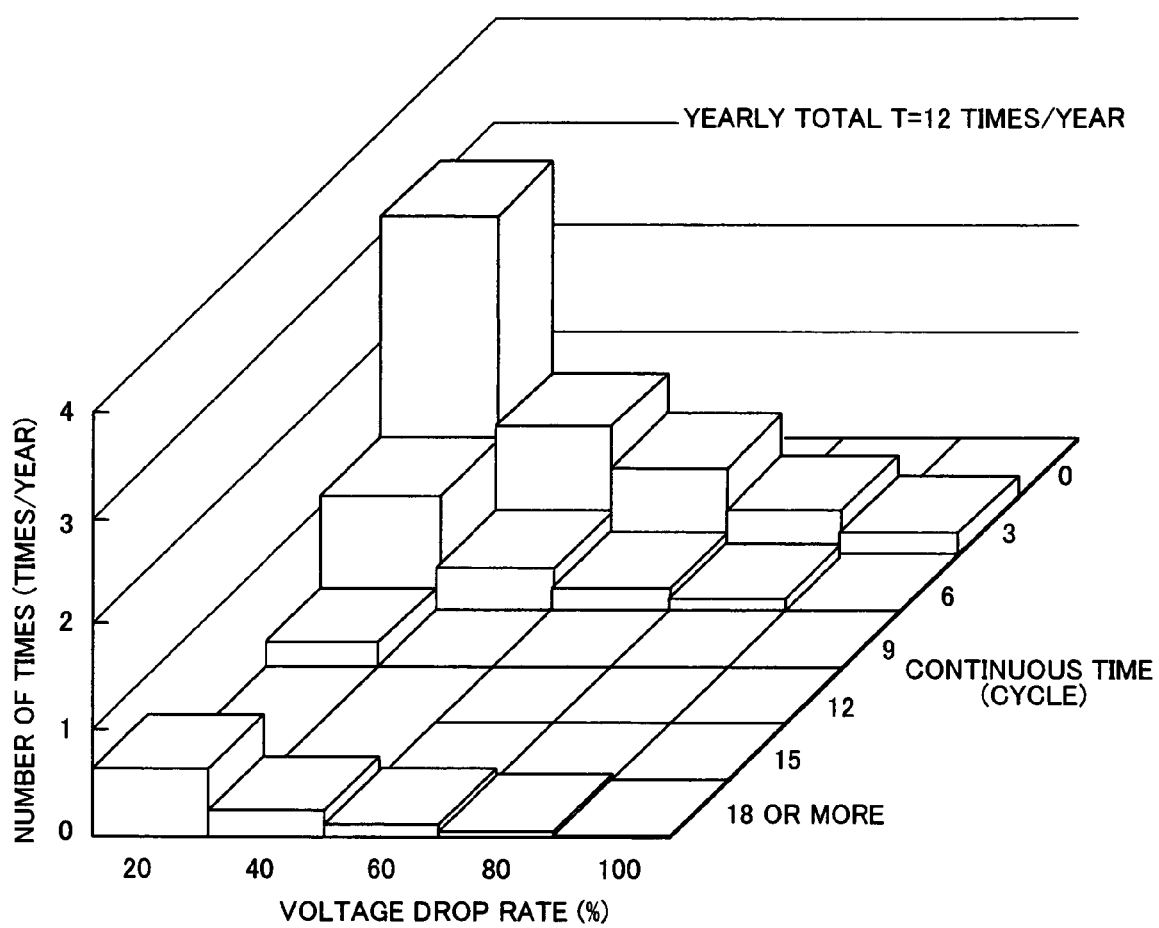

FIG. 8A schematically shows a configuration of the disk array device, and an entire configuration thereof;

FIG. 8B schematically shows a configuration of the disk array device, and an external configuration of a DKC module;

FIG. 9 is a diagram showing a configuration of a package and data wiring inside the DKC module;

FIG. 10 is a diagram showing a connection configuration example inside the DKC module;

FIG. 11 is a diagram showing a configuration example of blocks and data wiring in a CM box;

FIG. 12 is a diagram showing a flow of a basic processing operation, a user operation and the like in the backup method according to the present embodiment;

FIG. 13 is a diagram showing a flow of a first pattern (a processing control example) in the backup method;

FIG. 14A is a diagram showing a state of a battery in the first pattern;

FIG. 14B is a diagram showing a state of the battery in the first pattern;

FIG. 14C is a diagram showing a state of the battery in the first pattern;

FIG. 15 is a diagram showing a flow of a second pattern (a processing control example) in the backup method;

FIG. 16A is a diagram showing a state of a battery in a second pattern;

FIG. 16B is a diagram showing a state of the battery in the second pattern;

FIG. 17A is a diagram showing a state of a battery in a third pattern;

FIG. 17B is a diagram showing a state of the battery in the third pattern;

FIG. 17C is a diagram showing a state of the battery in the third pattern;

FIG. 18 is a diagram showing an example of a setting screen relevant to patterns of the backup method; and FIG. 19 is a diagram showing occurrences of instantaneous voltage drop in Japan as a reference.

DESCRIPTIONS OF THE PREFERRED EMBODIMENTS

<Prerequisite Technology>

First of all, conventional technologies (first method and second method), which are used as a prerequisite art in the present embodiment, will be described with reference to FIGS. 1 to 3. Contents of the conventional arts are the basically same as that of the present embodiment.

<First Method>

Figure 1A:
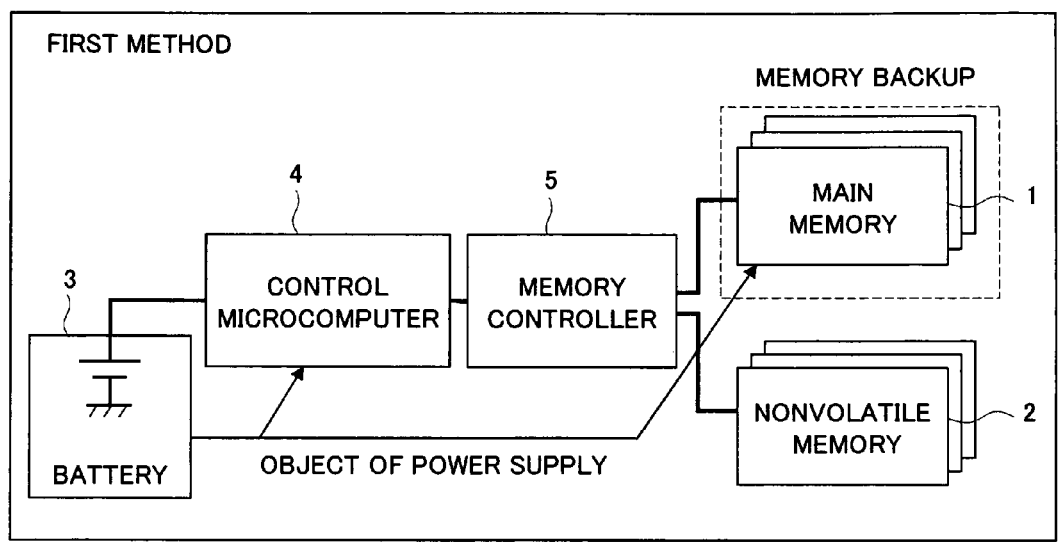
FIG. 1A shows a conventional technology which is used as a prerequisite for an embodiment of the invention, and a block diagram showing a configuration of a device in a first method.

FIG. 1A shows a block configuration of a device according to the first method ("memory backup method"). The configuration of the disk array device includes a main memory (first memory) 1, a nonvolatile memory (second memory) 2, a battery 3, a control microcomputer 4, and a memory controller 5. The control microcomputer 4 is connected with the main memory 1 and the nonvolatile memory 2 via the memory controller 5. The control microcomputer 4 and the like are connected with the battery 3, and the power can be supplied (discharge) to the respective components from the battery 3.

The control microcomputer 4 controls the entire system including the memory controller 5 and the like. The main memory 1 is a volatile memory such as a DRAM for storing data such as user data (cache data). The nonvolatile memory 2 is used for backup (evacuation) of data from the main memory 1. The memory controller 5 controls operations such as writing on/reading from the main memory 1 and the nonvolatile memory 2.

In the first method (mode), when a blackout occurs, the battery 3 is used to supply the power to the main memory 1 and the control microcomputer 4. With this, refresh operation of the main memory 1 is performed to retain the data in the main memory 1.

In the first method, the main memory 1 (DRAM) is allowed to operate in a self-refresh mode, auto-refresh mode, or the like. The self-refresh mode is a function generally provided in the DRAM, in which the memory itself performs the refresh operation automatically. In the auto-refresh mode, the main memory 1 performs the refresh operation responding to a command from the memory controller 5. The main memory 1 (DRAM) consumes 0.5 [W/DIMM] (reference vale) of the power in, for example, the self-refresh mode.

In the first method, the backup power for the main memory 1 is obtained by <power consumption of memory (0.5 [W/DIMM])>×<number of DIMM>×<backup time>. The backup power largely depends on the type, number, capacity of the memory, backup time and the like. The term "backup time" herein means a time period in which the data is retained by the power supply from the battery 3 (memory backup operation).

Figure 2:
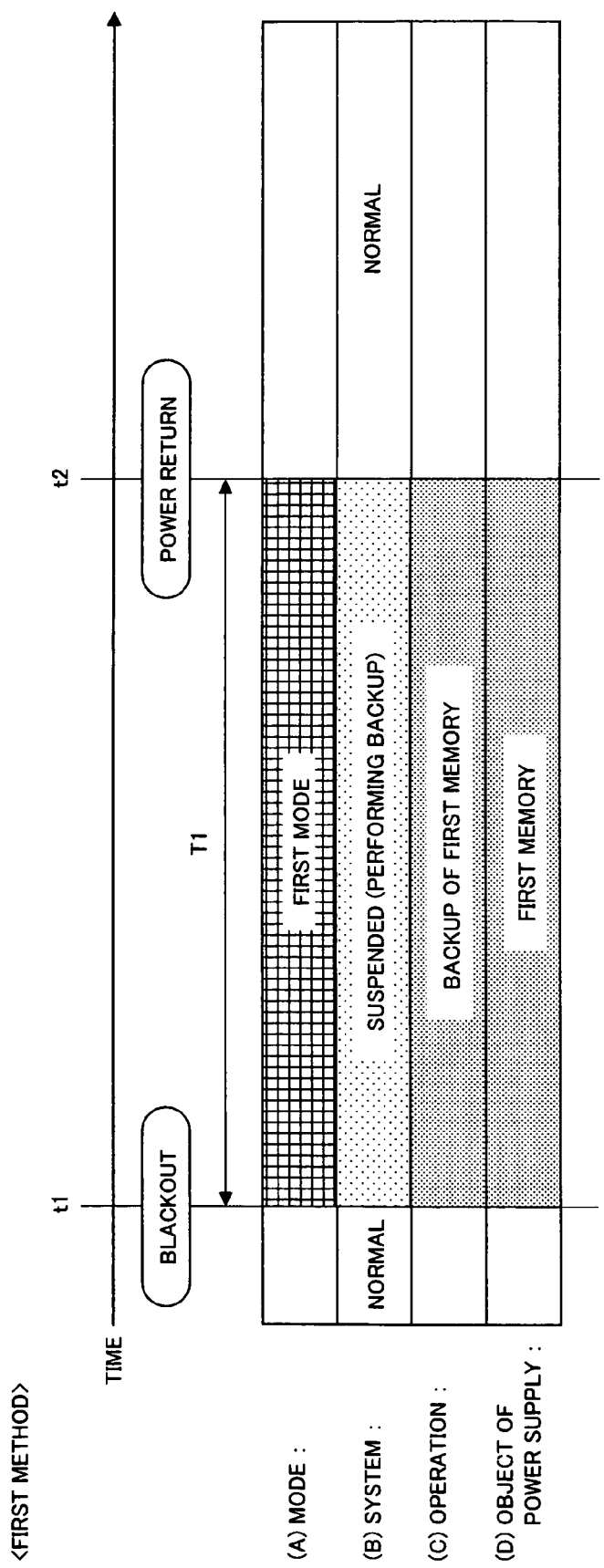
FIG. 2 is a diagram showing a timing of operation or the like in the first method (mode)

FIG. 2 shows a timing of operation and the like in the first method (mode) when blackout/return of the power supply occurs. The horizontal axis indicates time, (A) is mode; (B) is system status/operation; (C) is operation to the memory; and (D) is object of battery supply. Now it is assumed that a blackout occurs at a time of t1 when the system (device) is in a normal operation state. Due to the blackout, the operation is started in the first mode and the system (device) enters into a suspended state (during backup operation). A backup operation (memory backup operation) is performed with respect to the main memory 1. That is, the power is supplied from the battery 3 to the main memory 1, and the data is retained by the refresh operation of the main memory 1. It is assumed that, after that, the power returns at a time of t2. Then, the first mode is terminated, and the system returns to the normal operation state. T1 represents a blackout time period (blackout continuous time) from the blackout (t1) to the return of the power supply (t2). In the case of the long-time blackout time, since the power supply from the battery 3 runs out, the data in the main memory 1 is evaporated and is not maintained.

In the conventional first method and device, duration of the backup time is not taken into consideration, and the backup time is fixed to a predetermined limited time in accordance with the battery capacity 3. Actually, the duration of the actual blackout time is indefinite, and a fixed backup time is used to deal with the duration of the actual blackout time, thus the above-described problem arises.

<Second Method>

Figure 1B:
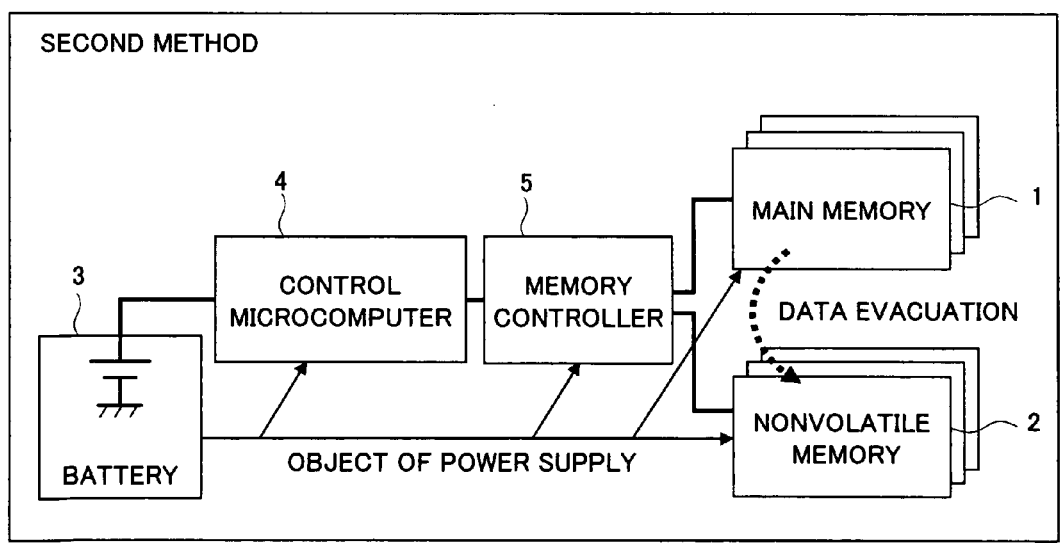
FIG. 1B shows a conventional technology which is used as a prerequisite for an embodiment of the invention, and a block diagram showing a configuration of a device in a second method.

FIG. 1B shows a block configuration of a device for a second method ("nonvolatile memory evacuation method"). The configuration of the present device is, for example, the same as that of FIG. 1A.

In the second method (mode), when a blackout occurs, data is evacuated from the main memory 1 to the nonvolatile memory 2 based on the power supply to the respective components (including main memory 1, nonvolatile memory 2, control microcomputer 4, and memory controller 5) from the battery 3. As the nonvolatile memory 2, recently, an SSD (solid state drive; flash memory drive) in which nonvolatile memory devices such as a NAND flash memory and the like are modularized is available. The data evacuated to the nonvolatile memory 2 is maintained without the power supply from the battery 3. When the power supply returns, the system reads out the data in the nonvolatile memory 2 and restores the data in the main memory 1, and thereby being restarted. Specifically, in the evacuating operation, the memory controller 5 reads out (copy) the data from the main memory 1 in read/write mode, and writes the data to the nonvolatile memory 2. After the evacuation of the data, the data is retained on the nonvolatile memory 2 without the power supply.

In the second method, the main memory 1 (DRAM) is allowed to operate in an auto-refresh mode and the like. The main memory 1 (DRAM) consumes, for example, 10.2 [W/DIMM] of the power in the auto-refresh mode and consumes 5.8 [W/DIMM] of the power in the read/write mode. The memory controller 5 consumes 10 [W] of the power; and the nonvolatile memory 2 (in the case of the SSD) consumes 5 [W/SSD] of the power.

The backup power in the second method is a total value of the power supplied to the objects (main memory 1, nonvolatile memory 2, control microcomputer 4 and memory controller 5) in an operation such as the evacuation operation. Therefore, as for an instantaneous power, the power in the second method becomes larger than the power in the first method. However, the operation time for evacuation and the like, which requires the power supply, is shorter than the power supply time for the backup operation of the main memory 1 in the first method (depending on a memory capacity and/or a transfer rate). Therefore, compared to the case of a long-time memory backup operation in the first method, the second mode consumes relatively a less amount of the power of the battery 3 in backup time, and thus the power and costs can be saved. After the evacuation of the data, since the data is retained on the nonvolatile memory 2, the data integrity is further ensured for the long-time blackout compared to the first method.

When the power supply returns, the data (evacuated data) is restored in the main memory 1 from the nonvolatile memory 2 based on the power supply to the respective components from the battery 3, and whereby the system (device) is restarted. Specifically, in the restoring operation, the memory controller 5 reads out the data from the nonvolatile memory 2 and writes the data to the main memory 1.

Figure 3:
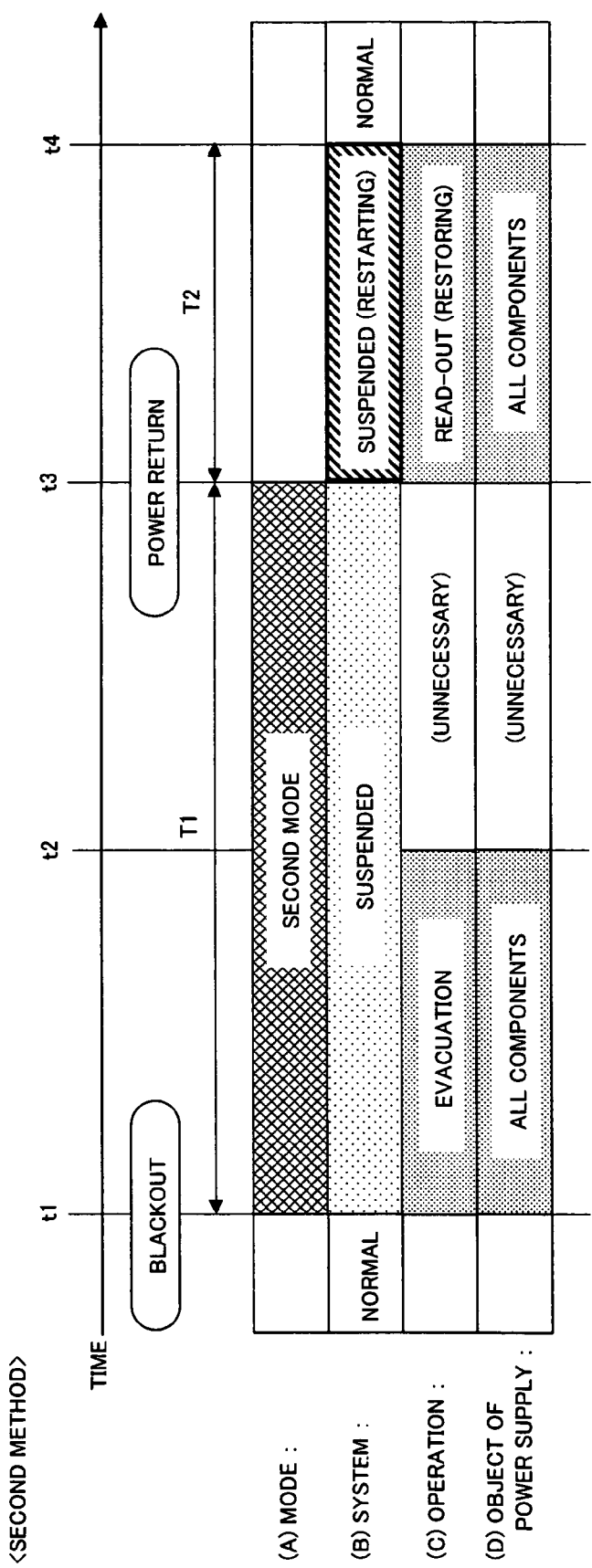
FIG. 3 is a diagram showing a timing of operation or the like in the second method (mode)

FIG. 3 shows a timing of an operation and the like in the second method (mode) when a blackout/return of the power supply occurs. It is assumed that a blackout occurs at a time of t1 during a normal operation state of the system (device). Due to this, the operation is started in the second method and the system (device) enters into a suspended state. The evacuating operation from the main memory 1 to the nonvolatile memory 2 is started. At this time, objects of the power supply from the battery 3 are all components relevant to the operation. The evacuating operation is completed, for example, at a time of t2. After the evacuation of the data, the power supply is not required.

It is assumed that, after that, the power supply returns at a time of t3. Then, in the system suspended (restarting) state, the data in the nonvolatile memory 2 is read out and restored in the main memory 1 in order to restart the system. For example, the read out operation (restoring) is completed from a time t3 to t4. With this, restarting the system is completed and returns to the normal operation state. T1 represents a blackout continuous time. T2 represents a restarting time (reading out/restoring time). Even when T1 is long, the backup power is suppressed to a predetermined amount.

In the conventional second method and device, immediately after returning the power supply, an overhead occurs due to a reading out time and a data conversion for the restoring (restarting) operation. Therefore, a certain time such as T2 is required. Particularly, in the case of the short-time blackout, the restarting time and the like is long as a whole, as a result, the performance of the device is lowered for a considerably long period (period of the lowered system performance).

<Backup Method>

Next, a backup method according to the present embodiment will be described with reference to FIGS. 4 to 7.

Figure 4:
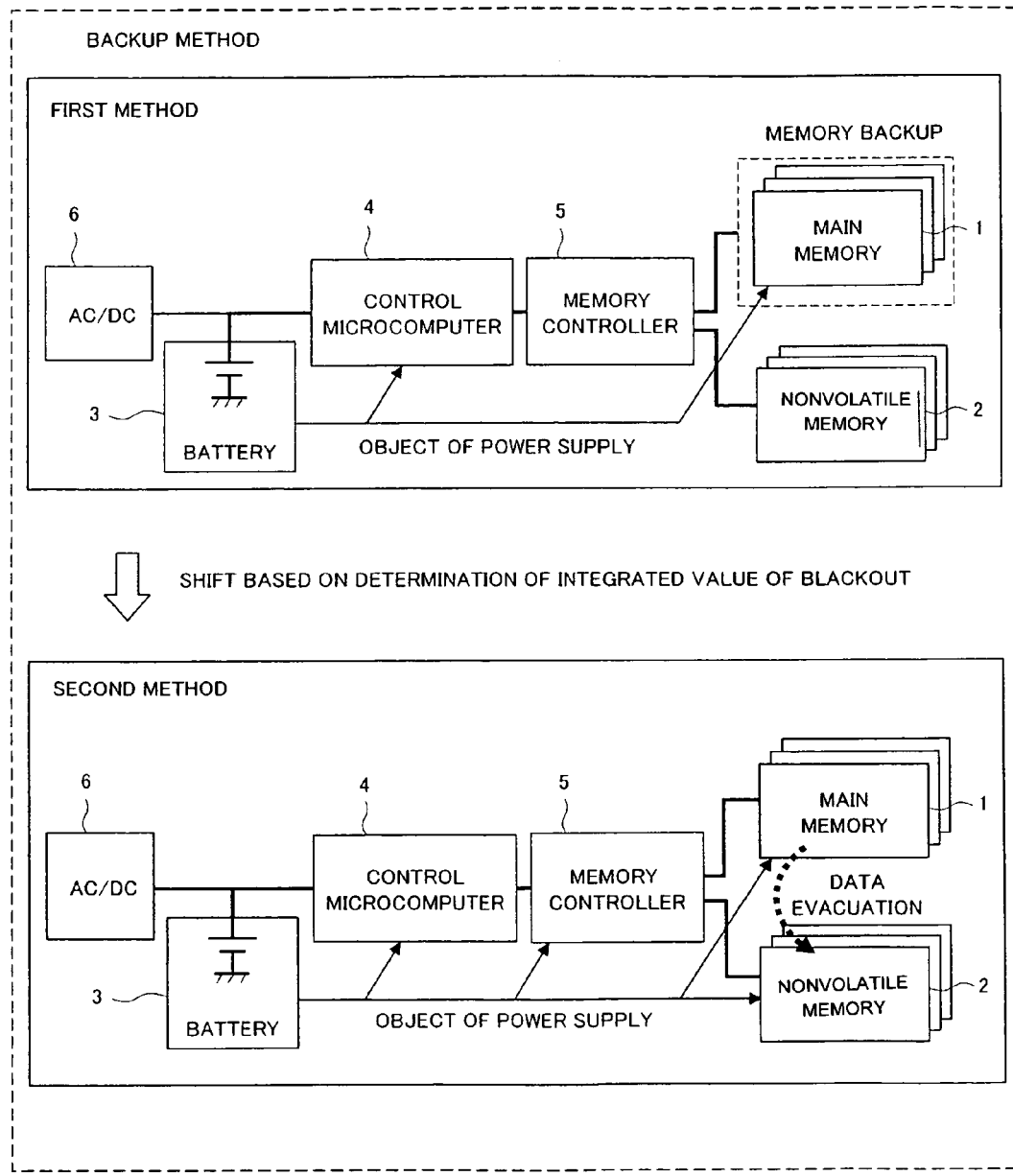
FIG. 4 is a diagram showing a block configuration and an outline of control in a disc array system in a backup method according to an embodiment of the present invention.

FIG. 4 shows a block configuration and an outline of a control in a disk array device according to the backup method of the present embodiment. Basically, the configuration of the device is the same as the conventional configuration of FIG. 1 and the like. In the configuration of FIG. 4, the control microcomputer 4 totally performs the control according to the backup method.

In the device and control, when a blackout occurs, first of all, the first method (mode), which is the same as shown in FIG. 1A, is applied to operate. Then, in the first mode, the blackout time and the like is integrated, and the integrated value is determined based on a condition. Then, when a timing which satisfies the condition, that is, a setting time has passed, the first mode is shifted to the second method (mode) to operate, which is the same mode as in FIG. 1B. When the power returns, the restarting operation of the system is performed. From an occurrence of the blackout to a predetermined time, the system is operated in the first mode.

The control microcomputer 4 integrates, for example, the blackout continuous time (or battery discharge current amount). The control microcomputer 4 compares the integrated value (blackout integration time) with a setting time (threshold value) by a user setting. When the integrated time reaches the setting time (threshold value), the mode is shifted to the second mode, and the data in the main memory 1 is evacuated to the nonvolatile memory 2.

Figure 5:
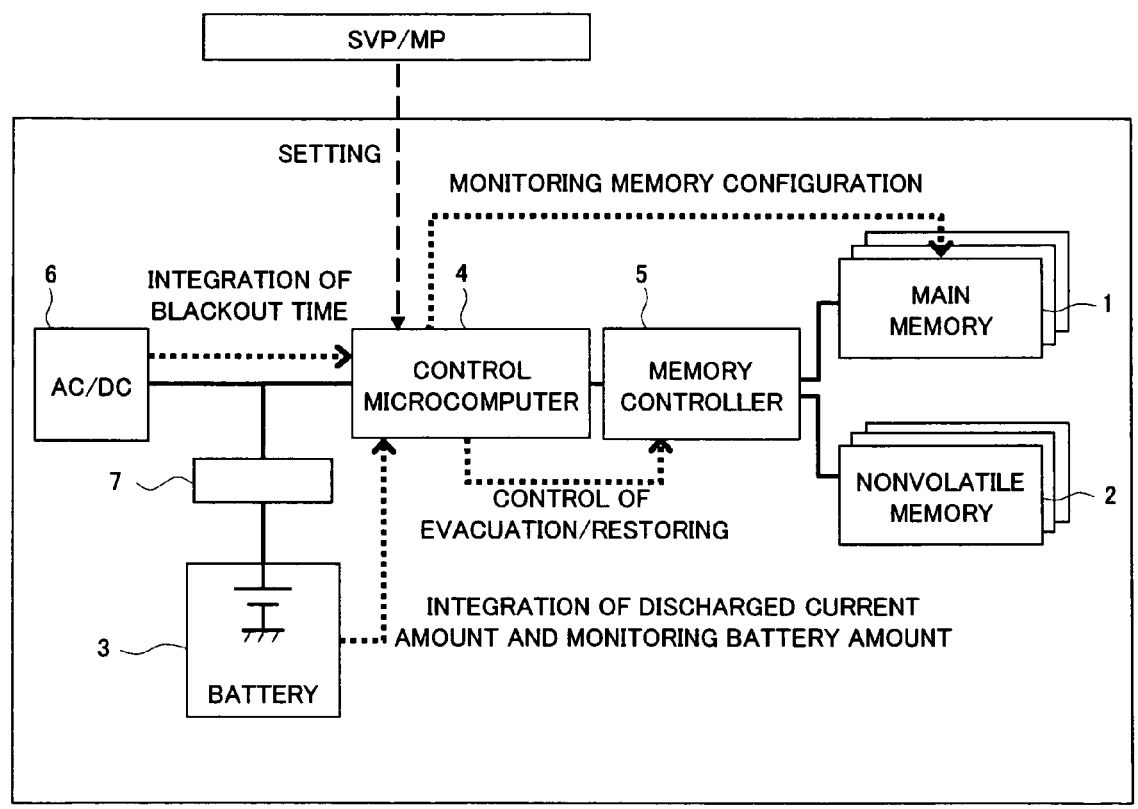
FIG. 5 is a diagram showing a processing function of a control microcomputer in a block configuration of the disc array system.

FIG. 5 shows the respective processing functions and operations for controlling in the device. The control microcomputer 4 comprises various processing functions such as detection of blackout/return of the power; integration of the blackout time and the battery discharge current amount; monitoring of the amount (state) of the battery 3; monitoring of the system configuration including a memory configuration; control of evacuation/restoring; a setting management function and the like. The control microcomputer 4 detects blackout/return of the power according to a state of the DC power supply from an AC/DC 6 (power source unit), and integrates the blackout time (blackout continuous time) by a counter function. In addition, the control microcomputer 4 detects changes in a current amount supplied from the battery 3 by a current amount detection circuit 7, and integrates the battery discharge current, and thereby comprehending the consumption amount and the remaining amount of the battery 3. When integration of the current amount is not carried out, the current amount detection circuit 7 is not necessary. The control microcomputer 4 monitors and recognizes the configurations of the main memory 1, the nonvolatile memory 2 and the like (type, capacity, number of DIMMs, and the like). The control microcomputer 4 also controls and manages the evacuating operation and the like of the second method (including comprehension of the battery amount required for the evacuating operation).

Further, the control microcomputer 4 comprises a setting management function relevant to the condition determination of the integration processing. When the control microcomputer 4 has a higher MP (micro processor), a service terminal (SVP) connected to the control microcomputer 4 via the memory controller 5 and the like, the control microcomputer 4 may be set and controlled through the MP, SVP and the like. A user interface, a maintenance management/setting function are provided for allowing a user (administrator) to set control conditions and the like for the control microcomputer 4, MP, or SVP (described later).

Incidentally, the integrated value of the blackout time (blackout integration time) has a relationship to the capacity, remaining amount and consumption amount (discharge current amount) and the like of the battery 3. If the integrated value of the blackout time or the battery discharge current amount is known, the other amounts can be known with a simple calculation. The battery amount required for backup may differ according to the configuration of the main memory 1. If the capacity of the main memory 1 and the like are known, the battery amount required for the evacuating operation is also known.

As for a setting value as the determination condition (threshold value), in the system, the setting value is automatically changed by the control microcomputer 4 in accordance with the system configuration and an alteration thereof, or the setting value can be set by a user. With this, the time of memory backup operation (first mode) can be prolonged according to an alteration of the memory configuration in order to appropriately deal with the alteration.

Figure 6:
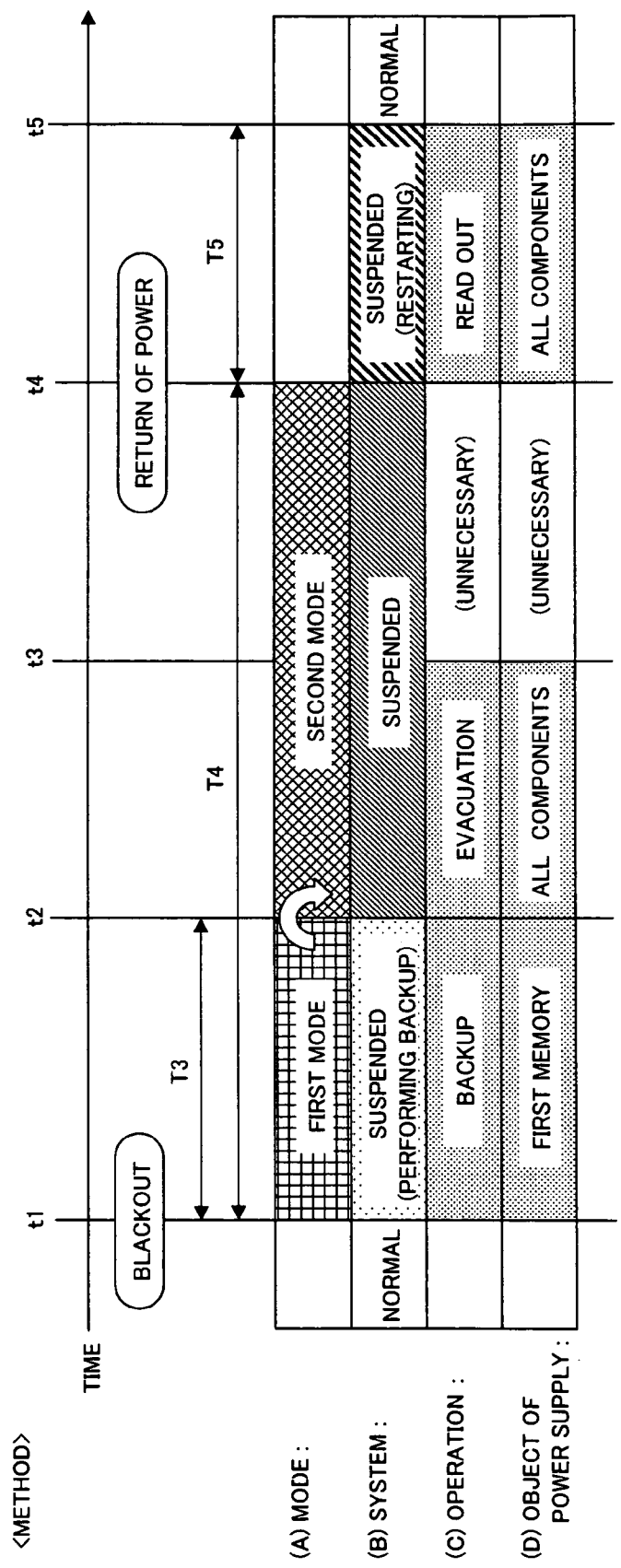
FIG. 6 shows the timing of operation and the like in the backup method according to the present embodiment.

FIG. 6 shows a timing of an operation and the like in the backup method when the blackout occurs and the power returns. (A) shows a mode; (B) shows system status/operation; (C) shows an operation to the memory; and (D) shows object of battery supply. It is assumed that a blackout occurs at a time of t1 when the system (device) is in a normal operation state. With this, the operation is started in the first mode and the system (device) enters into a suspended (during backup) state. The backup operation (memory backup operation) is performed for the first memory (main memory) 1 by the power supply from the battery 3.

T3 represents an integrated value (blackout integration time) of the blackout continuous time from the occurrence of the blackout (t1). When the integrated value reaches a predetermined threshold value, the control microcomputer 4 shifts from the first mode to the second mode, and the system is in a suspended state. For example, at a time of t2, the condition is satisfied and the mode is shifted.

The mode enters into the second mode, an evacuating operation from the main memory 1 to the nonvolatile memory 2 is performed, and the evacuation is completed at, for example, a time of t3. It is assumed that, for example, the power supply returns at a time of t4. With this, the second mode is terminated. T4 represents a resultant blackout continuous time. Then, in the system suspended (restarting) state, the evacuated data in the nonvolatile memory 2 is read out and restored in the main memory 1. For example, the reading out (restoring) operation is completed at a time of t5. T5 represents the restarting time (restoring time). Thus, restarting the system is completed and the system returns to the normal operation state.

For the description, as a temporal separation, a time range of the first mode is defined as t1 to t2, and a time range of the second mode is defined as t2 to t4. In the first mode, since the integration processing is used, both of the long continuous blackout and a plurality of successive blackouts are included. The time range of the second mode mainly includes the evacuating operation, and excludes the restoring operation time. Note that, although the example in FIG. 6 is a case where the power supply returns after the mode has been shifted to the second mode, in the case where the power returns before the shift (when the blackout integration time does not reach the threshold value), the result is the same as shown in FIG. 2 (first method only).

According to this method, in an initial stage (t1 to t2) corresponding to the short-time blackout, restarting performance is excellent by applying the first mode. After the shift, in a stage corresponding to the long-time blackout (t2 or later), suppression of battery consumption (reduction of the battery capacity) and ensuring the data integrity are excellent by applying the second mode. That is, as whole, both advantages of the first and second modes are well balanced. Different from the conventional art, in this method, magnitude of the backup power and the backup time is taken into consideration, and according to the magnitude, switching the mode (shifting) is appropriately controlled. Particularly, by controlling the memory backup operation time in the first mode in the blackout initial stage, this method can effectively handle the short-time blackout which occurs frequently generally. That is, by not using the second mode, reduction of the restarting time can be achieved.

Figure 7:
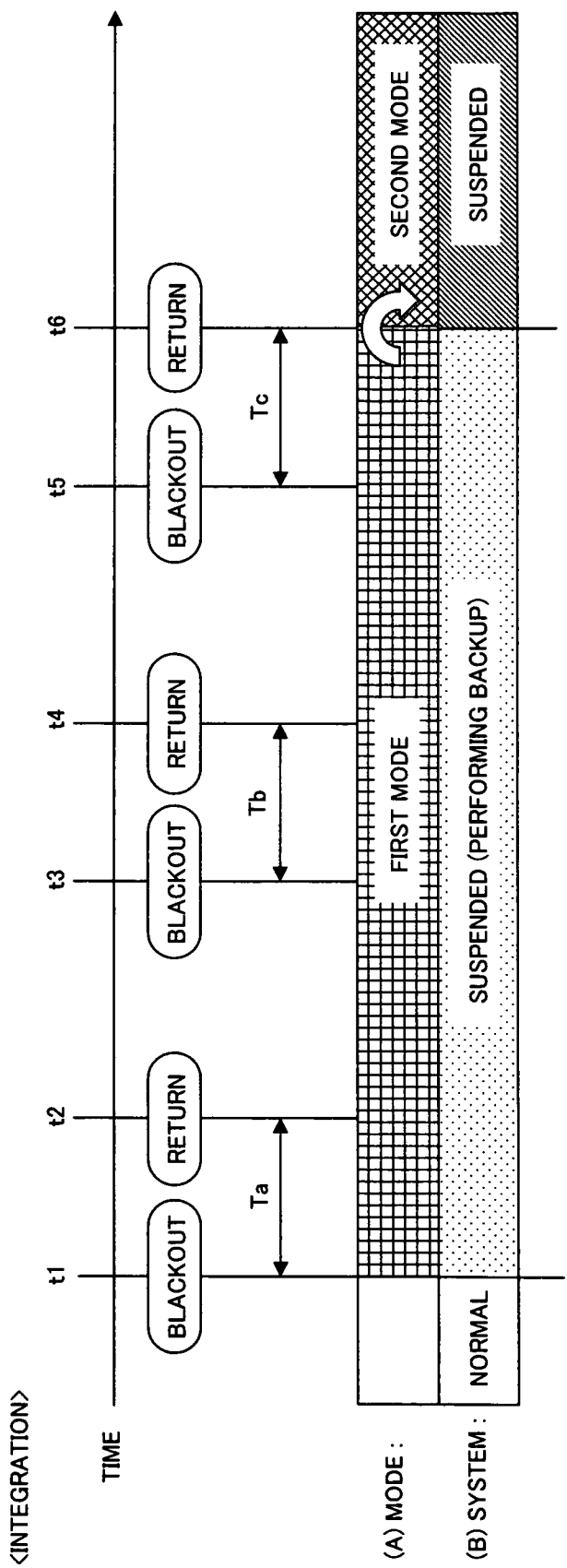
FIG. 7 is a diagram showing a timing of operation and the like for explaining an integration processing in the backup method.

In FIG. 7, a supplemental description will be given about the integration processing in the backup method. In this method, not limited to the case of the continuous blackout, but also the case where the plural short-time blackouts such as an instantaneous blackout, instantaneous voltage drops or the like occur successively and continuously, the problem can be handled appropriately by the integration processing (first mode operation). The case where a plurality of instantaneous blackouts occurs successively is considered as an example in FIG. 7. Ta to Tc are respectively an instantaneous blackout time. For example, a first instantaneous blackout (Ta) occurs at a time of t1 ("blackout") from a system normal operating state, and at a time t2, the instantaneous blackout (Ta) terminates ("return"). After that, likewise, instantaneous blackouts (Tb, Tc, ...) occur intermittently. In the first mode, the control microcomputer 4 integrates the blackout continuous times of the respective instantaneous blackouts. That is, the integrated value is a value obtained by adding instantaneous blackout times Ta, Tb and Tc. The integrated value is used for determination. For example, when the integrated value reaches a predetermined threshold value, the mode is shifted to the second mode.

Generally, the instantaneous blackout and the like occur frequently. Therefore, in the case of the system only with the conventional second mode, when the instantaneous blackout occurs successively as described above, the evacuating operation (and restarting operation) is carried out every time the instantaneous blackout occurs. Therefore, the time period of the lowered system performance becomes long, and the system becomes unstable. Contrarily, in the method according to the present embodiment, the above problem can be avoided by the integration processing.

<Disk Array Device>

Next, FIG. 8 schematically shows a configuration of a disk array device to which the backup method of the present embodiment is applied.

In FIG. 8A, the entire of the disk array device is configured with a combination of DKC modules 100 and HDD boxes 200. The DKC module 100 comprises a DKC (disk controller), and the HDD box 200 comprises a disk array (HDD group). The object of the backup method is the DKC module 100.

In FIG. 8B, the DKC module 100 is configured with a plurality of boxes and units mounted on a casing. The type of the box includes a CM box 110, an MP box 120 and the like. The box is a box in which a circuit board or the like is incorporated in a box-like casing, and which is multiplexed with functional units constituting the DKC and mounted on the casing detachably if necessary. The CM box 120 has a CM (cache memory) function of the DKC, and the MP box 120 has an MP (micro processor) function of the DKC.

The plurality of CM boxes 110 and MP boxes 120 are connected to one side of the casing. Boxes and units of a power source system are connected to the other side of the casing. As the power source system, an SWPS 130 which is a power supply unit for normal operation, a battery as a power supply unit for blackout/backup and the like are provided. The SWPS 130 is a switching power supply unit which converts an AC power source input into a DC power source and supplies the DC power source to the respective components including the DKC.

In FIG. 9, a configuration of packages, data wiring and the like inside the DKC module 100 (DKC) is shown. Duplicated DKCs 300 are included. The DKC 300 includes respective units (packages) of a CM 10, an MP 40, an SW 50, an FA 60, a BA 70 and the like. The respective units (packages) are multiplexed and are detachable if necessary. A unit (backup system) 400 including the CM 10, an SSD 20 (equivalent to the nonvolatile memory 2) and a battery (BT) 30 (equivalent to the battery 3) is in the minimum range applied with the backup method; for example, a CM box 110. The configuration example in FIG. 9 is a configuration in which the SSD 20 and the battery 30 are located outside the DKC 300 and the CM 10. The configuration is not limited to the above. A configuration in which the SSD 20 and/or battery 30 are located inside the DKC 300 and the CM 10 is also possible.

The CM (cache memory unit) 10 is a main memory (equivalent to the first memory 1) of the DKC 300, which is a volatile memory for caching the data. The CM 10 is also a high-speed memory which compensates a performance difference between the processing device (DKC 300) and the storage device (HDD group). The CM 10 is made to correspond to the CM box 110.

The MP 40 (micro processor unit) is a processor of the DKC 300. The MP 40 is made to correspond to the MP box 120. The FA (front end unit) 60 is a host interface unit, or a channel interface unit for an external connection. The BA (back end unit) 70 is an HDD interface unit within the disk array device. The SW (switch) 50 connects the respective units such as the CM 10, MP 40, FA 60, BA 70 and the like to each other to perform a control of the data transmission and the like.

The SSD 20 connected to the CM 10 is an example of the nonvolatile memory 2, and is for evacuation of the data of the CM 10. The battery 30 connected to the CM 10 is used in the backup operation.

In FIG. 10, a connection configuration example in the DKC module 100 is shown. The FA 60 is connected to a higher host 500 by a predetermined interface. The FB 70 is connected to a logical volume or a logical device (LDEV) 600 configured with an HDD in the HDD box 200. The LDEV 600 stores various data including user data sent from the host 500 through the CM 10.

LRs (local router) 61 and 71 in the FA 60 and BA 70 include a hub function and an MP allotment function. A CMA (cache memory adapter) 11 in the CM 10 is a memory controller LSI (memory management control unit in the CM) for controlling the data input and output, which is a unit equivalent to the memory controller 5. The MEM (memory) 12 is a cache main memory (equivalent to the first memory 1). An MCH (memory controller hub) 41 in the MP 40 is a memory controller (CM management control unit at MP side). An MP 42 is a main body of MP.

Furthermore, for example, the CM 10, the MP 20 and the like in the DKC 300 are connected with a maintenance terminal (SVP) 700. Alternatively, a configuration in which the higher host 500 comprising a maintenance and management function is connected thereto may be possible. With this, a processing function of maintenance management/setting of the disk array device (including a setting function, which is described later) is provided.

The written data from the higher host 500 is stored (cached) in the MEM 12 of the CM 10 through the FA 60 and SW 50 and notified to the MP 40. The data (cache data) of the MEM 12 in the CM 10 are stored in the LDEV 600 through the SW 50 and BA 70 in accordance with control by the MP 40.

In the disk array device, the respective processing functions are configured so as to be separated from each other in the respective boxes, packages and the like, and therefore, the disk array device has advantages of measures against static electricity, radio wave noises, and the like in addition to the multiplexity.

<CM Box>

In FIG. 11, a configuration example of a block and data wiring in the CM box 110 (CM 10) to correspond to the unit (backup system) 400. In the present configuration example, the SSD 20 (equivalent to the second memory 2) and the battery (BT) 30 (equivalent to the battery 3) are connected inside the CM box 110 but outside of the CM 10. The configuration is not limited to the above, but the configuration in which the SSD 20 and BT 30 may be connected outside the CM box 110, or inside the CM 10 is possible. The CM 10 includes the CMA 11, the MEM 12 (equivalent to the first memory 1), a bridge chip 13, an SH microcomputer 14 and a PW microcomputer 15.

The SH microcomputer 14 is a control microcomputer which controls the CM 10. The SH microcomputer 14 and the like are connected with the BT 30. The SH microcomputer 14 is connected to the PW microcomputer 15 and the CMA 11. The PW microcomputer 15 is a power source management microcomputer in the CM 10, and is inputted with a DC power source from an AC/DC 90. The AC/DC 90 (equivalent to AC/DC 6) is an AC-DC power source converting unit as well as a DC power source input thereof. The SH microcomputer 14 and the PW microcomputer 15 are equivalent to the control microcomputer 4.

The CMA 11 connects among the control microcomputer 14, the MEM 12 and the bridge chip 13. In the CMA 11, an SH-IF 11-1 is an interface between the SH microcomputer 14 and an MCTL 11-3. The SW (switch) 11-2 is a switch in the CMA 11 and connects among the SH-IF 11-1, the MCTL 11-3 and a PCIe port 11-4. The MCTL (memory controller) 11-3 is a memory controller in the CMA 11, and performs a control to the MEM 12. The PCIe port 11-4 is a PCIe output, and is connected to the bridge chip 13. The bridge chip 13 is an interface converting unit between the PCIe and the SATA, and is connected to the SSD 20.

<Basic Control>

Next, with reference to FIGS. 12 to 17, basic controls and patterns (control examples) of the integration processing, the processing thereof, and the like in the backup method and the disk array device will be described.

FIG. 12 shows a flow of a basic processing operation and user operation in the present method ("S" represents a processing step and the like). A user (administrator) operates, for example, the SVP 700 to perform a setting input.

At the S1, the control microcomputer 4 (SH microcomputer 14) checks a configuration of the memory mounted on the device and determines a range of the integrated time. The capacity, number of the first memory 1 (MEM 12) and the like are checked, and the threshold value of the blackout integration time and the like are also checked based on the setting.

At the S2, a basic setting of the blackout integration time is requested on a screen of a maintenance management and setting of the SVP 700 and the like based on a user operation. Responding to the request, information of the basic setting is displayed on the setting screen. At the S3, the user inputs a setting time T on the setting screen if necessary. The setting time T is the threshold value relevant to the blackout integration time T3 in FIG. 6. At the S4, based on the determination, when the setting time T is 0, the process proceeds to No. 4 (FIG. 14) (that is, the setting in which the first method is not used). When T is not 0, the process proceeds to S5.

Likewise, at the S5, the user requests a setting a pattern of a processing control for occurrence of a blackout on the screen of the SVP 700 and the like. Responding to the request, information about a pattern selection setting is displayed on the setting screen. At the S6, the user performs an input (selection) of the pattern or checks the setting of the pattern. For example, a first pattern (time integration) is selected.

At the S7, the battery capacity is checked (detection of initial full charge). The control microcomputer 4 and the like checks whether the capacity (remaining amount) of the battery 3 (BT 30) is in a fully charged state (maximum amount). This processing step is equivalent to a reset operation for the control. By checking the fully charged state of the battery 3, accuracy of the control is improved. A considerable amount of the battery amount is required for the memory backup operation and the evacuating operation.

At the S8, with determination, when the battery is in a fully charged state (Y), the process proceeds to the S11. When the battery is not in a fully charged state (N), the fact in which, for example, the backup is impossible due to insufficient charge is displayed on the screen of the SVP 700 and the like to notify to the user at the S9. At the S10, the battery is then charged and the process returns to S7.

At the S11, when the second pattern is selected, the process proceeds to number 2 (FIG. 16). At the S12, when a third pattern is selected, the process proceeds to a control according to the third pattern. Since the third pattern is a combination of the first pattern and the second pattern, a flow description is omitted.

Figure 14:
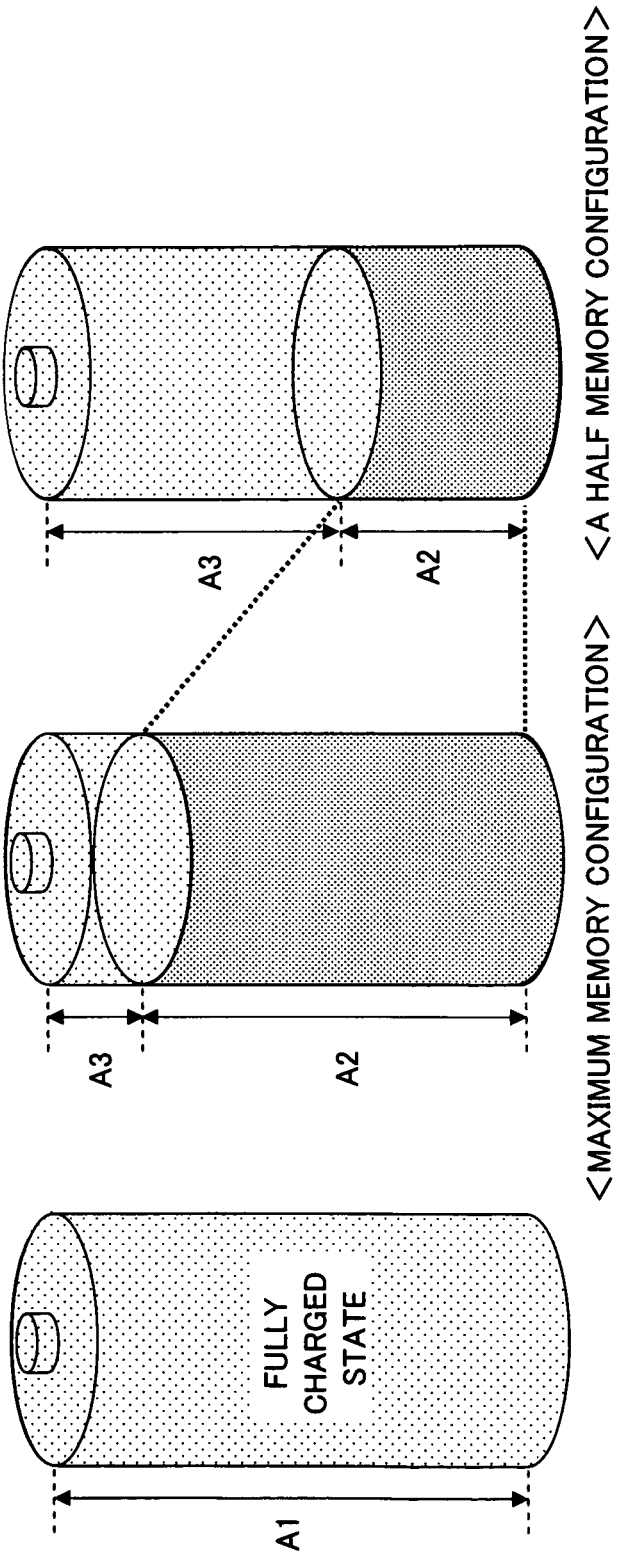

At the S13, the control microcomputer 4 and the like determine whether a blackout state or not (blackout detection), and when no blackout is detected (N), the process returns to the S7. When a blackout is detected (Y), the process proceeds to number 1 (FIG. 14).

<Control Examples>

In the configuration of the method and the device, the following three patterns (controls) are available.

In the first pattern, only the time (blackout continuous time) is integrated, and the integrated value (blackout integration time) is determined based on the condition, and the mode is shifted. In the first pattern, the backup time according to the first mode can be directly set as the setting time T. In the first pattern, from the detection time of the battery 3 being in a fully charged state to the setting time T, the system is operated in the first mode. After the setting time T, the data can be reliably evacuated in the second mode. In the first pattern, since only the time is integrated, the counter function and the like of the control microcomputer 4 may be used, so that the circuit configuration is not complicated. Incidentally, in the first pattern, the battery 3 has to be checked that the battery 3 is in a fully charged state. The precise control can not be performed if the battery 3 is not in a fully charged state.

In the second pattern, the battery discharge current amount is integrated (unit: [Ah]) in stead of time. The integrated value (integrated current amount, that is, battery consumption amount) or a processed value thereof (the battery remaining amount, etc) is determined based on the condition, and the mode is shifted. The battery remaining amount is known by subtracting the battery consumption amount (battery discharge current amount) from the predetermined capacity of the battery mounted on the device (maximum amount, fully charged state). In the second pattern, the shift timing is automatically determined in accordance with the battery consumption amount (discharged current amount). The both first and second patterns are the same in a point that the shift timing is determined by taking the backup power or the battery amount into consideration. In the second pattern, in addition to the same working as that of the first pattern, a memory backup operation time can be changed depending on the battery remaining amount or the memory configuration. With this, the battery capacity can be maximally utilized.

Specifically, in the second pattern, by taking the battery amount required for the evacuating operation into consideration, a possible time of the first mode and the battery amount corresponded thereto are comprehended, and whereby the shift timing is determined. The second pattern is automatically controlled based on the state of the memory and the battery state recognized by the control microcomputer 4, so that the user setting is not performed.

The third pattern is a combination of the first pattern and the second pattern. In the third pattern, a user setting of the time similar to the first pattern is performed with considering the second pattern. In the first mode, both of the blackout time and the battery discharge current amount are integrated. When the integrated value satisfies the condition, the mode is shifted to the second mode.

In the first pattern and the third pattern, the user can set the time relevant to the integration processing (or the battery consumption amount corresponding thereto).

<First Pattern>

Next, referring to FIG. 13 and FIG. 14, the first pattern (time integration) will be described. FIG. 13 shows a flow of the first pattern. Mainly, the control microcomputer 4 performs the control. At the S101, the operation of the first mode is started. That is, a backup of the first memory is performed by the power supply, and at the same time, the blackout time is integrated. At the S102, it is determined whether the power has returned (power return detection). When the power has returned, the process proceeds to the S107. When the power has not returned, the process proceeds to the S103.

At the S103, as the integration process of the blackout continuous time, it is determined whether the blackout integration time, which is the integrated value, reaches a setting time T (threshold value) or not. When the value does not reach T (N), the operation of S101 is repeated in the first mode. When the value reaches T (Y), the process proceeds to the S104.

At the S104, the mode is shifted to the second mode, and the operation is started. That is, the evacuating operation to the second memory 2 is started based on the power supply. At the S105, it is determined whether the evacuating operation is completed. When the evacuation is completed (Y), the process proceeds to the S106. At the S106, output (power supply)

from the battery 3 is turned OFF, and the system waits for return of the power. After that, when the power returns, the system restores the evacuated data as described above to perform a restarting operation.

On the other hand, at the S107, when the power returns, the memory backup operation is terminated (including a case of temporary termination due to the intermittent blackout). At the S108, the system waits for a system ON signal, and the battery 3 is charged. At the S109, it is determined whether the battery 3 is in a fully charged state. When the battery 3 is not fully charged (N), it is determined whether the blackout is a successive blackout (in the case of the intermittent blackout as shown in FIG. 7) at the S110. In a case of the successive blackout (Y), the process returns to number 1 (S101). In a case of a non-successive blackout (N), the process returns to the S108. In the fully charged state (Y), the blackout integration time is reset at the S111, and the process proceeds to number 5 (FIG. 13).

FIG. 14 shows a state of the battery relevant to the first pattern for convenience of description. FIG. 14A is a battery capacity (maximum amount) A1 of the battery 3 in a fully charged state. FIG. 14B shows, in the battery 3 with the maximum memory configuration (the system configuration with the maximum capacity of the first memory 1), a battery amount A2 required for one evacuating operation to the non-volatile memory 2 in the second mode, and a battery amount A3 corresponding to the time period (battery amount corresponding to the first mode possible time) in which the operation (memory backup operation) of the first mode is possible in a case of the battery amount A2. The battery amount A3 (the battery amount corresponding to the first mode possible time) is obtained by subtracting the battery amount A2 required for the evacuation from the battery capacity A1 in a fully charged state. The system allows the user to set a threshold value relevant to the time of the first mode (T3 in FIG. 6) within a range of A3. The control microcomputer 4 operates the first mode during the time period corresponding to the battery amount A3.

FIG. 14C shows the amount A2 and A3 of the battery 3 in the case where the memory configuration is a half of the configuration size of the case shown in FIG. 14B (for example, capacity or number of the main memory 1 is a half). The battery amount A2 required for the evacuation varies depending on the memory configuration. According to this, the battery amount A3 corresponding to the first mode possible time is varied. When A2 is small, A3 becomes larger accordingly. The control is performed in accordance with magnitude of the A3.

<Second Pattern>

Next, referring to FIG. 15 and FIG. 16, the second pattern (current integration) will be described. FIG. 15 shows a flow of the second pattern. At the S201, it is determined whether a blackout occurs (blackout detection). In a case of a blackout (Y), the control microcomputer 4 monitors the battery remaining amount and integrates the battery discharge current amount at the S202. At the S203, the operation of the first mode is performed. At the S204, it is determined whether the power returns. When the power returns (Y), the process proceeds to the S209. When the power does not return (N), the process proceeds to the S205.

At the S205, it is determined, based on the integrated current amount, whether the battery remaining amount decreases to the evacuation capacity (battery amount A2 required for the evacuation) due to the discharge. If the battery remaining amount does not reach the evacuation capacity (N), the first mode operation is continued at the S203. If the battery remaining amount reaches the evacuation capacity (Y), the process proceeds to the S206 and the mode is shifted to the second mode. That is, the evacuating operation to the second memory 2 is started. At the S207, it is determined whether the evacuating operation is completed. When the evacuation is completed (Y), the process proceeds to the S208. At the S208, the output of the power (power supply) from the battery 3 is turned OFF, and the system waits for the return of the power. After that, when the power returns, the system restores the evacuated data to perform the restarting operation as described above.

On the other hand, at the S209, when the power returns, the memory backup operation is terminated (including a case of temporarily completion due to the intermittent blackout). At the S210, the system waits, or the battery 3 is charged, and the battery remaining amount is recalculated. At the S211, it is determined whether the battery 3 is in a fully charged state. In the case where the battery 3 is not fully charged (N), it is determined whether a successive blackout occurs at the S212, and when the successive blackout occurs (Y), the process returns to number 2, but when the successive blackout does not occur (N), the process returns to the S210. In the case where the battery is in the full-charged state (Y), the integrated value of the battery discharge current amount is reset at the S213, and the process proceeds to number 5 (FIG. 13).

FIG. 16 shows a state of the battery relevant to the second pattern for convenience of description. FIG. 16A represents the battery capacity (maximum amount) A1 in a fully charged state. FIG. 16B shows a battery amount A2 required for the evacuating operation, a battery amount A3' corresponding to the first mode operation possible time, a battery remaining amount A4 and an insufficient charge amount A5 in the battery 3. A5 represents the insufficient charge amount at the time. For example, a state at the time of a blackout is shown with the insufficient charge amount A5 of the battery and the remaining amount A4. The battery remaining amount A4 is obtained by subtracting the insufficient charge amount A5 from the battery capacity A1 in the fully charged state.

In the second pattern, the user setting for a threshold value of the battery discharge current amount is not necessary, and the control microcomputer 4 or the like sets the threshold value automatically. Since the battery amount state can be known by integrating the battery discharge current amount, even when there is the insufficient charge amount A5 in stead of the fully charged state of the battery 3, the control is possible. In the second pattern, when the battery amount A2 required for the evacuating operation is remained, the mode is always shifted to the second mode.

<Third Pattern>

Next, referring to FIG. 17, the third pattern (method of time integration and current integration) will be described. FIG. 17 shows a state of the battery relevant to the third pattern for description. FIG. 17A shows the battery capacity (maximum value) A1 in a fully charged state. FIG. 17B shows a battery amount A2 required for the evacuating operation, a battery level A3' corresponding to the first mode operation possible time, a battery remaining amount A4, and an insufficient charge amount A5 in the battery 3, as described above. Further, FIG. 17C shows a user setting time A6 (battery amount corresponding to user setting time).

In the second pattern, as shown in FIG. 17B, the first mode is operated with the battery amount A3' corresponding to the time obtained by abstracting the battery amount A2 required for the evacuation and the insufficient charge amount A5 from the battery capacity A1. Contrarily, in the third pattern, as shown in FIG. 17C, the user setting time A6 can be set within a range of the battery amount A3' based on FIG. 17B. Within the A6, the first mode is operated.

In the third pattern, as with the second pattern, the control is possible even when the battery 3 is not in the fully charged state. When a battery amount which is a total amount of the battery amount A2 required for the evacuating operation and the battery amount equivalent to the user setting time A6 is in a charged state, the control is possible to be performed.

<Setting Screen>

FIG. 18 shows an example of a window for setting a pattern of the backup method (in other words, control conditions) as described above. A setting window of "BACKUP PATTERN" is displayed on the display of the SVP 700 and the like at the user operation. On a section of "PATTERN SETTING", a desired pattern can be selected from three patterns: "TIME INTEGRATION PATTERN"; "CURRENT INTEGRATION PATTERN"; and "TIME & CURRENT INTEGRATION PATTERN" with an ON/OFF button. Also, on a section of "TIME INTEGRATION PATTERN", a setting value (threshold value) of the above described integrated time can be selected in a desired numeral value. In FIG. 18, for example, 60-second is displayed. Numeral values displayed for setting are limited within a range capable of normally controlling. For example, a numeral value corresponding to the battery amount A3 in FIG. 14 is used. Also, the setting can be performed with a battery amount corresponding to the time value (which is obtained with a simple calculation) instead of the time value. In addition, settings for system configuration such as a memory configuration and a battery configuration may be possible to be displayed and set in relation of above described setting.

As an example of utilizing the system, in the case of the user setting, the user sets an integrated time or the like on the setting screen in accordance with the memory configuration, blackout characteristics, and the like. With this, the shift timing is determined, and a desired effect can be obtained. Also, the effect can be adjusted by adjusting the setting value. For example, the user sets the value so that a predetermined first mode time is ensured based on experiences and a forecast that the instantaneous blackout occurs frequently. In this control, the first mode is intervening before the second mode, and therefore, in a case of the short-time blackout, such an effect that the data can be handled in the first mode before shifting to the second mode inferior in a restarting performance can be obtained.

<Effect of the Invention>

As described above, according to the present embodiment, a backup method and a disc array system provided with both advantages of restarting performance in the first method in case of the short-time blackout and of the data integrity in the second method in the case of the long-time blackout in a well balanced manner, can be achieved with a minimum battery capacity at a low cost.

Additionally, the effects obtained by the present embodiments will be described as follows.

(1) Reduction (suppression of increase) and optimization of the battery capacity mounted on the disk array device can be achieved. A backup system in accordance with the system configuration (for example, memory capacity, presence or absence of a UPS (uninterruptible power supply unit), and the like) and blackout characteristics (occurrence frequency, local characteristics, and the like) can be achieved by mounting a battery capacity optimized to have the minimum capacity. An optimum backup system can be built in accordance with the user environment.

(2) Reduction of restart time (total system performance reduction time) for the short-time blackout can be achieved. By applying the first method to the short-time blackout which generally occurs frequently, the restart time can be reduced.

(3) Reduction of the battery capacity and ensuring the data integrity for the long-time blackout can be achieved with the minimum configuration of the battery and the like.

(4) With respect to the short-time blackout, umber of times of writing to a nonvolatile memory can be reduced by a method in which the evacuation timing to the nonvolatile memory is delayed. With this, the life of the nonvolatile memory and the system reliability are improved.

In foregoing, the invention made by the inventor has been specifically described based on the embodiments. However, the present invention is not limited to the above-described embodiments. It is needless to say that the present invention may be variously modified without deviating from a scope of spirit of the present invention.

What is claimed is:

1. A disk array device, comprising:
a disk array;
a controller thereof;
a power supply unit for normal operation; and
a battery for backup,
the controller including a first memory storing first data for normal operation and a second memory for backup, the first memory comprising volatile memory and the second memory comprising nonvolatile memory,
wherein, during backup control of the first data at a time of an occurrence of a blackout and a return of power, a first mode in which the first data is retained based on power supplied from the battery to the first memory, and a second mode in which the first data of the first memory is evacuated onto the second memory based on power supplied from the battery to respective units and which waits for the return of power, are used,
wherein, upon a blackout occurring, the disk array device is suspended and first operates in the first mode with battery power, integrates a blackout continuous time during operation of the disk array device in the first mode, and shifts from the first mode to the second mode to operate in the second mode upon the blackout continuous time reaching a predetermined time period corresponding to the battery power and a configuration of the first and second memories,
wherein the disk array device includes a processing function for allowing a user to select and set a desired pattern from a first pattern, a second pattern, and a third pattern on a setting screen as a pattern of backup control,
wherein, in the first pattern, the blackout continuous time is integrated during the first mode, and, at a timing in which an integrated value based on the blackout continuous time reaches a corresponding predetermined value, the first mode is shifted to the second mode,
wherein, in the second pattern, a battery discharge amount is integrated during the first mode, and, at a timing in which an integrated value based on the battery discharge amount reaches a corresponding predetermined value, the first mode is shifted to the second mode, and
wherein, in the third pattern, the blackout continuous time and a battery discharge amount are integrated during the first mode, and, at a timing when an integrated value based on both of the blackout continuous time and the battery discharge amount reaches a corresponding predetermined value, the first mode is shifted to the second mode.

2. The disk array device according to claim 1, wherein after shifting to the second mode, upon the return of power, the data of the second memory is read out and restored onto the first memory to restart the system.

3. The disk array device according to claim 1, wherein during the third pattern of backup control, during the first mode, the blackout continuous time and the battery discharge amount are integrated, and at a timing in which a consumption amount or a remaining amount of the battery, recognized with the integrated value of the blackout continuous time and the battery discharge amount, reaches the predetermined value, the first mode is shifted to the second mode, and the predetermined value is a battery amount and a time corresponding thereto, which are set within a battery amount range from a first amount required for the evacuating operation and an a second amount obtained by subtracting an insufficient discharge amount from a capacity of the battery.

4. The disk array device according to claim 3, wherein the disk array device has a processing function for allowing the user to set the predetermined value on the setting screen.

5. The disk array device according to claim 1, wherein before or during backup control, the disk array device has a processing of checking a capacity and a remaining amount of the battery, and charging the battery to be in a fully charged state if the battery is not in the fully charged state.

6. The disk array device according to claim 1, wherein the disk array device has a processing function for allowing the user to set a threshold value with respect to the integrated value of the blackout continuous time on the setting screen.

7. The disk array device according to claim 1, wherein during the second pattern of backup control, upon the blackout occurring, the disk array device is first operated in the first mode until a consumption amount or a remaining amount of the battery recognized with the integrated value of the battery discharge amount reaches a battery amount obtained by subtracting an amount required for the evacuating operation and an insufficient discharge amount from a capacity of the battery.

8. The disk array device according to claim 7, wherein during backup control, the disk array device recognizes the configuration of the first and second memories including the first memory capacity, and recognizes the amount required for the evacuating operation in accordance with the first memory capacity to determine the timing at which the first mode is shifted to the second mode in accordance with the battery amount required for the evacuating operation.

9. A disk array device, comprising:
a disk array;
a controller thereof;
a power supply unit for normal operation; and
a battery for backup,
the controller including:
a first memory storing first data for normal operation and a second memory for backup, the first memory comprising volatile memory and the second memory comprising nonvolatile memory; and
a control microcomputer and a memory controller connected to the first and second memories, the power supply unit for normal operation and the battery,
wherein, during backup control of the first data at a time of an occurrence of a blackout and a return of power, the control microcomputer uses a first mode in which the first data is retained based on power supplied from the battery to the first memory, and a second mode in which the first data of the first memory is evacuated onto the second memory based on power supplied from the battery to respective units and which waits for the return of power,
wherein, upon a blackout occurring, the disk array device is suspended and first operates in the first, mode with battery power, integrates a blackout continuous time during operation of the disk array device in the first mode, and shifts from the first mode to the second mode to operate in the second mode upon the blackout continuous time reaching a predetermined time period corresponding to the battery power and a configuration of the first and second memories,
wherein the disk array device includes a processing function for allowing a user to select and set a desired pattern from a first pattern, a second pattern, and a third pattern on a setting screen as a pattern of backup control,
wherein, in the first pattern, the blackout continuous time is integrated during the first mode, and, at a timing in which an integrated value based on the blackout continuous time reaches a corresponding predetermined value, the first mode is shifted to the second mode,
wherein, in the second pattern, a battery discharge amount is integrated during the first mode, and, at a timing in which an integrated value based on the battery discharge amount reaches a corresponding predetermined value, the first mode is shifted to the second mode, and
wherein, in the third pattern, the blackout continuous time and a battery discharge amount are integrated during the first mode, and, at a timing when an integrated value based on both of the blackout continuous time and the battery discharge amount reaches a corresponding predetermined value, the first mode is shifted to the second mode.

10. The disk array device according to claim 9, wherein the control microcomputer performs detection of the occurrence of the blackout and the return of power based on a power supply from the power supply unit for normal operation;
integration of the blackout continuous time by a counter function;
recognition of a configuration of the first memory; and
control of the evacuating operation by reading out and writing the data with respect to the first and second memories using the memory controller.

11. The disk array device according to claim 10, further comprising a current amount detection circuit connected to the battery, wherein the control microcomputer integrates a discharge current amount of the battery using the current amount detection circuit, and recognizes a battery state with the integration.

12. The disk array device according to claim 10, wherein the disk array device has a processing function to perform a setting with respect to control of the shift through a higher processor connected to the control microcomputer.

13. A disk array device, comprising:
a disk array;
a controller thereof;
a power supply unit for normal operation; and
a battery for backup,
the controller having a package of a cache memory, and the package of the cache memory having:
a first memory storing first data for normal operation, the first memory comprising volatile memory; and
a control microcomputer and a memory controller connected to the first memory, the power supply unit for normal operation, and the battery,
wherein a second memory and the battery for backup are connected to or built in the package of the cache memory and the second memory comprises nonvolatile memory,
during backup control of the first data at a time of an occurrence of a blackout and a return of power, the control microcomputer uses a first mode in which the first data is retained based on power supplied from the battery to the first memory, and a second mode in which the first data of the first memory is evacuated onto the second memory based on power supplied from the battery to respective units and which waits for the return of power, wherein, upon a blackout occurring, the disk array device is suspended and first operates in the first mode with battery power, integrates a blackout continuous time during operation of the disk array device in the first mode, and shifts from the first mode to the second mode to operate in the second mode upon the blackout continuous time reaching a predetermined time period corresponding to the battery power and a configuration of the first and second memories, wherein the disk array device has a processing function for allowing a user to select and set a desired pattern from a first pattern, a second pattern, and a third pattern on a setting screen as a pattern of backup control, wherein, in the first pattern, the blackout continuous time is integrated during the first mode, and, at a timing in which an integrated value based on the blackout continuous time reaches a corresponding predetermined value, the first mode is shifted to the second mode, wherein, in the second pattern, a battery discharge amount is integrated during the first mode, and, at a timing in which an integrated value based on the battery discharge amount reaches a corresponding predetermined value, the first mode is shifted to the second mode, and wherein, in the third pattern, the blackout continuous time and a battery discharge amount are integrated during the first mode, and, at a timing when an integrated value based on both of the blackout continuous time and the battery discharge amount reaches a corresponding predetermined value, the first mode is shifted to the second mode.

* * * * *